(12) United States Patent
Hecht

(10) Patent No.: US 6,365,257 B1
(45) Date of Patent: Apr. 2, 2002

(54) CHORDAL PREFORMS FOR FIBER-REINFORCED ARTICLES AND METHOD FOR THE PRODUCTION THEREOF

(75) Inventor: Daniel Howard Hecht, Duluth, GA (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/291,858

(22) Filed: Apr. 14, 1999

(51) Int. Cl.[7] ............................................... B29D 22/00
(52) U.S. Cl. ........................ 428/65.9; 428/37; 428/66.2
(58) Field of Search ...................... 188/218 R, 218 XL; 192/107 M, 107 R; 428/65.9, 66.2, 37

(56) References Cited

U.S. PATENT DOCUMENTS

| | | | |
|---|---|---|---|
| 3,867,491 A | 2/1975 | Marin | 264/29 |
| 3,917,352 A | 11/1975 | Gageby | 301/63 PW |
| 4,032,607 A | 6/1977 | Schulz | 264/29.3 |
| 4,629,644 A | 12/1986 | Matuska | 428/137 |
| 4,666,753 A | 5/1987 | Matuska et al. | 428/137 |
| 4,695,341 A | 9/1987 | Matuska et al. | 156/161 |
| 4,773,891 A | 9/1988 | Hoffmann | 464/181 |
| 4,790,052 A | 12/1988 | Olry | 28/110 |
| 5,184,387 A | 2/1993 | Lawton et al. | 29/419 |
| 5,217,770 A | 6/1993 | Morris, Jr. et al. | 428/36.3 |
| 5,705,008 A | 1/1998 | Hecht | 156/148 |

FOREIGN PATENT DOCUMENTS

| | | |
|---|---|---|
| DE | 1291648 | 3/1969 |
| GB | 2013294 A | 8/1979 |

*Primary Examiner*—Deborah Jones
*Assistant Examiner*—Alicia Chevalier
(74) *Attorney, Agent, or Firm*—Jennifer M. Hall

(57) ABSTRACT

The present invention relates to the fabrication of thick, three-dimensional preforms comprising fibers disposed as chords of a circle, and to composites comprising such structures embedded in a matrix material such as a thermoset resin, ceramic, metal or carbon. The fibrous preform structure composed of fiber disposed as chords of a circle produces a range of composite structures from isotropic orientation at the lamina level to balanced, symmetric lamina to best satisfy end use requirements. Carbon-carbon fiber composite articles produced from these chordal preforms are obtained by carbonizing such structures followed by infiltration with pyrolytic carbon using CAD processes exhibit attractive properties for high energy friction applications.

14 Claims, 6 Drawing Sheets

CHORDAL PREFORMS FOR FIBER-REINFORCED ARTICLES AND METHOD FOR THE PRODUCTION THEREOF

FIELD OF THE INVENTION

This invention relates to continuous fiber preforms for reinforced composites and composites containing such preforms. More particularly, this invention relates to carbon fiber preforms comprising continuous tows of carbon fiber disposed as chords of a circle to form a near net shape part.

BACKGROUND OF THE INVENTION

The present invention is particularly concerned with improved carbon-carbon fiber composites intended for use in applications where severe shear stresses will be encountered, for example, by being subjected to circumferential stress. A prime example of such use is a friction disc employed in a disc brake. Such discs are essentially annular in shape, having at least one surface of each disc being provided with a friction-bearing surface. Braking is accomplished through contact between the friction-bearing surfaces of the discs, thereby converting the mechanical energy of the rotating brake to heat. In addition to withstanding the shearing stresses, the discs also are required to act as heat sinks, absorbing high heat loads. Because of its strength, density, heat capacity, thermal conductivity, coefficient of friction and stability to its sublimation temperature (about 3600° C.), carbon has been particularly attractive for use in constructing such disc brakes, particularly where weight is a major consideration such as in aircraft. Strength and stiffness of a composite are controlled by the orientation of the reinforcement fibers in the matrix. When reinforcement fibers are straight and continuous, the stresses are efficiently transferred through the composite in the direction of the fiber. If the reinforcement fibers are crimped or discontinuous, efficiency drops as the stresses are transferred out of the reinforcement and through the matrix.

In the prior art, composites have generally been fabricated by orienting or directionally aligning the carbon fiber component, which generally has been thought necessary in order to take advantage of fiber strength and enhance mechanical properties of the composite. Fabricating the composite with the desired fiber orientation is more readily accomplished by use of continuous carbon fiber, and such fiber has been preferred over discontinuous fiber for these applications. The primary forms of continuous fiber employed in composite fabrication include woven textile fabric or unidirectional tapes for use in lay-up structures, and continuous fiber yarn or tow, which are used for filament winding of hollow cylindrical shapes and in braided structures.

For example, in U.S. Pat. No. 4,790,052 to Orly carbon composite brakes are produced using a quasi-isotropic layup of uni-directional webs as the reinforcement. These webs are layered so that angles of around 0°/–60°/+60° are formed between the filaments of successive layers of the structure. Though the total web stack is quasi-isotropic, each web is an extremely unbalanced reinforcement which must withstand multi-dimensional forces being transferred through a uni-directionally reinforced web. At load points such as the lugs of a brake disc, very high interlaminar stresses are generated and may cause failure through delamination. To resist these stresses, a very high degree of needlefelting is used to add reinforcement through the stack which will crimp the reinforcement fibers and reduce their effectiveness. The Orly method has economic and performance drawbacks as well. The method is complex and leads to poor material utilization because unidirectional webs which are rectangular are used to make annular shaped parts.

An improvement in the Orly method was made in U.S. Pat. No. 5,184,387 to Lawton. In Lawton, a unidirectional layer of filaments is subjected to needlefelting to provide dimensional stability. The layer is then cut into a plurality of arc-shaped segments and those segments are assembled side by side to produce the annular shape. This method—similar to that used in the garment industry—reduces the wastage of material and permits the layer to be cut so that the filaments run radially in some segments and circumferentially in others. This method yields a 0/90° layup in that the filaments in a superimposed layer of segments is disposed at a 90° angle to those filaments of a lower layer of segments. The resulting composite is less isotropic than Orly and also requires a high degree of needlefelting to prevent delaminations.

Still another method is disclosed in U.S. Pat. No. 5,217,770 to Morris et. al. This method uses an annular braid web to form a mat which is then needlefelted to form a 3-D structure. The braid contains helical fibers woven at approximately 40 degrees and unidirectional fibers which become circumferential during laydown. One or more braids are used to fill the brake annulus which is then needlefelted. This method achieves a near net-shaped part with fibers oriented to handle circumferential and shear loads. However, using braids to build the structure is a complex textile operation that adds to the cost. In addition, the helical fiber volume and angle is not uniform throughout the annulus due to the use of a tubular braid to form an annulus. When a straight braid is curved into an annulus the fibers in the braid are forced closer together at the inner periphery of the annulus and pulled apart at the out periphery of the annulus changing their angles and fiber density.

As noted, needlefelting is widely used in the textile arts to strengthen stacked fabric structures and improve structural integrity. Generally described, needlepunching operations are carried out by forcing barbed needles normally through the stack layers in the thickness direction. A portion of the fiber within the fabric layers is gathered by the barbs and repositioned in the thickness direction, reinforcing the individual fabric layers as well as the stack. If the fibers making up the layers are continuous, the needlepunching operation necessarily breaks individual filaments when re-orienting them. To avoid or at least minimize such breakage, improved processes wherein staple fiber is included within the structure, either as part of the fabric layer or as alternating layers of staple fiber sheet, have been used to supply staple fiber to the needles for re-orienting in the needlepunching operation. Needlepunching operations have been employed in the art with carbon fiber sheet and tape to provide preform structures having good integrity for use in the production of carbon-carbon fiber reinforced composites.

The high degree of fiber alignment within the structure of these prior art composites is intended to take advantage of the strength and dimensional stability of the carbon fiber. However, composites having the entire fiber content aligned in a single direction are highly anisotropic in character, exhibiting a high degree of strength and dimensional stability in the fiber direction while suffering greatly reduced strength properties and poor dimensional stability in the transverse direction. To ensure that the strength of the composite, as well as its heat transfer characteristics and other important properties, are reasonably uniform and to minimize unidirectional shrinkage which may cause warping and distortion, the fiber direction is varied throughout the prior art structures, imparting some isotropic character to the composite. The lamina, however, still suffers from anisotropic effects. When using more costly fabric or the like, the fabricator still has had to resort to varying fiber orientation between successive layers of the structure, for example, using a 0/90° orientation in one layer, +/−45° in the next, and so on, thereby providing a composite having less anisotropic characteristics at the lamina level and being nearly quasi-isotropic overall. As described above, three-dimensional weaving, needlepunching and similar operations are often employed to add through-thickness fiber orientation and improve interlayer strength properties to accommodate these anisotropic stresses. However, a preform with isotropic character throughout the structure, especially at the lamina level, in the fiber reinforcement continues to be difficult to attain.

Current methods for producing carbon-carbon fiber reinforced composites exhibit further shortcomings. For most applications, finished carbon parts generally are made to precise dimensions, and their production requires conducting extensive shaping and machining operations on carbonized or fully graphitized carbon-carbon fiber composite blanks. Precision machining operations are expensive to carry out and difficult, and great care is needed with carbon-carbon fiber composites to avoid cracking or other damage. Carbon blanks having substantially the finished shape and dimensions, termed net shape blanks, would reduce the extent of machining needed and significantly lower costs. However, carbonized preforms are generally friable and cannot be readily formed or shaped. Constructing shaped preforms from layered fabric or fiber sheet thus generally requires cutting component parts having the desired final shape from fabric sheet before stacking and needlepunching. Such cutting operations are wasteful and produce considerable quantities of scrap fabric. Even when suitable methods for recycling of the scrap are found, the production and re-processing of scrap further increases the energy and waste disposal burdens already imposed on the manufacturing process, significantly raising the overall cost of producing the carbon article.

Methods for forming non-woven webs of carbon fiber have also been disclosed in the art, for example in U.S. Pat. No. 4,032,607 to Schulz. According to patentees, particularly attractive webs may be formed from mesophase pitch by melt- or blow-spinning the pitch, air-layering or water-layering the resulting fiber either as-spun or after being chopped, and thermosetting or air-oxidizing the non-woven web to stabilize the structure before carbonizing. Generally, the resulting webs are composed of random filaments rather than filament bundles or tow, and take the form of low density, thin felts and papers with very low bulk densities, generally well below about 0.3 g/cc. Non-woven webs may be suitable for use in forming layered carbon-carbon fiber structures in the same manner as continuous fiber tape and fabric by employing prior art layering and needlepunching operations such as those described herein above. Even after the needlepunching, structures comprising such highly randomized filaments generally will have a low fiber volume and consequently a very low density. Such structures do not provide the strength advantages generally obtained when using dense, high fiber volume structures comprising aligned and oriented continuous fiber, either in woven textile form or as unidirectional fiber tape.

A method for fabricating carbon fiber preforms and carbon-carbon fiber composites having superior strength properties and good thermal characteristics from substantially continuous fiber, preferably in a near net-shape and avoiding the use of unidirectional tapes, fibers or webs that exhibit reduced strength and poor dimensional stability in the transverse direction, would be particularly valuable to the carbon composites art.

Thus, it is an object of the present invention to provide improved reinforced composites. It is a further object to provide high strength fiber reinforced structures for composite materials. It is a further object of the present invention to form a near net-shape circular or annular friction disc preform resulting in less wastage of costly reinforcement fiber. It is a further object of the invention to provide a preform with reinforcement fibers that are disposed as chords of a circle at numerous angles and that remain as straight and continuous as possible across the preform to maximize reinforcement effectiveness. It is still a further object of this invention to provide a friction disc of nominally isotropic properties in the plane with a wide range of fiber orientation on the lamina level and throughout the overall composite. Finally, it is an object of the invention to provide a method of making a friction disc preform that can be easily modified to change the tow size, number of tows used and the chordal angles selected for winding to optimize the desirable mechanical and wear properties of a carbon/carbon brake.

BRIEF SUMMARY OF THE INVENTION

Chordal preforms having a three-dimensional fiber structure suitable for use as reinforcement in the manufacture of composites and particularly desirable for use in producing high-strength, high thermal conductivity carbon-carbon fiber reinforced composites may be produced by disposing fibers as chords of a circle to fill the circle, or an annulus within the circle, of a friction surface which is then needlefelted into a 3D felt. Disposing the reinforcement fibers as chords of a circle, for standard geometries, creates a preform or a portion of a preform that is substantially isotropic at the lamina level and which contains reinforcement fiber tows that are non-unidirectional and sufficiently straight to achieve reinforcement effectiveness. The needlefelting serves to increase the density of the structure and to re-orient a portion of the fiber in the thickness direction to improve integrity and strength characteristics. The preform may conveniently be produced directly from fiber as a net-shape preform having the general overall shape of the final product, together with dimensions adjusted to accommodate for such shrinkage as may occur during subsequent thermal treatment. The net-shape winding process minimizes the scrap production and concomitant waste encountered in prior art processes for fabricating high-strength reinforcing textile fabric, sheet and tape, and reduces the need for extensive machining and forming operations.

The preferred preform will generally comprise carbon fiber and, though made without resort to binders or the like, the mechanical strength of the preform is adequate to withstand subsequent carbon composite manufacturing operations including infiltration with pyrolytic carbon or impregnation with a carbonizable filler and subsequent carbonization. The preform may also have application in the manufacture of fiber-reinforced thermoset and thermoplastic resin matrices, metal matrix and ceramic matrix composite structures.

A dense carbon-carbon fiber composite may be readily produced by depositing pyrolytic carbon within the invented preforms using well-known chemical vapor deposition processes and infiltration operations generally known and widely employed in the composite art. Alternatively, the preform may be impregnated with a carbonizable filler, cured under pressure and heat, and then further heated to carbonize the filler together with any pitch fiber component present, thereby providing a dense carbon-carbon fiber composite. Multiple infiltrating or impregnating operations may be employed if needed to produce a product having the desired density, and the processes may be used in combination. As used herein, the term "carbon" is intended to include both ungraphitized and graphitized carbon. Thus, carbon fiber preforms may comprise graphitized or partially graphitized carbon reinforcing fibers or a mixture thereof, and carbon-carbon fiber composites comprising such reinforcement embedded in a matrix of graphitized or partially graphitized carbon. Articles in which matrix, and possibly the fiber, are still in the thermoset state are also included.

Thus, in one embodiment this invention provides a preform wherein 5–100% of the preform fibers are disposed as chords of a circle. In another embodiment, this invention provides a composite preform comprising fibers disposed as chords of a circle to provide a preform that is substantially isotropic at the lamina level with respect to its strength, stiffness and thermal properties. In another embodiment, this invention provides a carbon fiber preform comprising carbon fiber tows disposed as chords of a circle to provide a preform that is substantially isotropic at the lamina level with respect to its strength, stiffness and thermal properties. In another embodiment, this invention provides a carbon fiber preform that is balanced and symmetric about any central axis or point comprising substantially continuous carbon fiber tows disposed as chords of a circle such that different chord angles are used at various planes of the preform so that properties needed at different planes of a wear disc are optimized. In another embodiment, this invention provides a carbon fiber preform comprising substantially continuous carbon fiber tows disposed as chords of a circle and chopped fiber disposed in the preform and preferentially aligned in the z-axis direction. Another embodiment provides a method of manufacturing a fiber preform comprising continuously disposing fibers as chords of a circle by winding the fibers around a mandrel at selected chord angles so that the preform has substantially uniform fiber areal weight with fibers disposed to incorporate a wide range orientations dispersed throughout the preform.

DETAILED DESCRIPTION

A three-dimensional carbonized fiber preform suitable for use in the manufacture of high strength carbon-carbon fiber composites may be made from substantially continuous fiber according to the invention without application of a binder or an impregnant. This preform construction, unlike prior art, is tow based yielding both a highly controlled and dispersed fiber orientation. The structure is assembled from fine reinforcement units covering the wide range of orientations allowed by the annular geometry. The annular geometry is best described by the ratio of the outside diameter to the inside diameter of the preform, OD/ID. Most OD/ID ratios produce reinforcement orientations that are substantially isotropic. For the purposes of this invention, substantially isotropic means that the preform exhibits near isotropy with respect to its strength, stiffness and thermal properties at the lamina level. A lamina being about 0.005 to 0.100 inches thick as discussed below.

Figure 4:
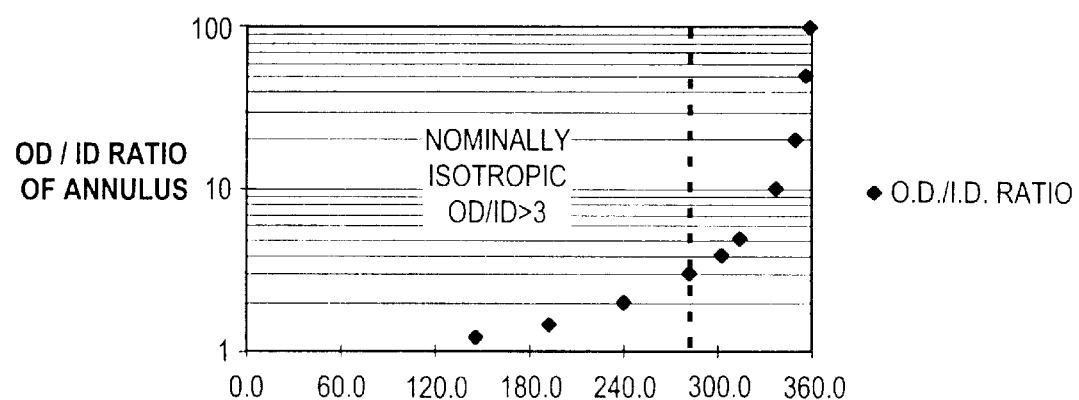
FIG. 4 Shows the change in isotropy for net shape preforms with respect to changes in the ID/OD ratio.

As shown in FIG. 4, a large OD/ID ratio yields fiber orientations covering all angles. Thus, annuli with little or no ID are planar isotropic, i.e. isotropic at the lamina level, in mechanical and thermal properties. As the OD/ID ratio is reduced, the annulus becomes thinner, and the fiber orientation retains its substantially isotropic nature until very small OD/ID ratios are encountered. At OD/ID ratios of around 3, the orientation becomes significantly anisotropic, with increased properties in the circumferential direction. Thin annuli discs made in accordance with the present invention that require greater isotropy than achievable by the chordal preform construction, can be augmented by large chord angles to achieve the degree of isotropy desired at a cost of increased scrap. Isotropy or even radially enhanced reinforcement can be achieved by adding additional processing capabilities to add radial fibers at added cost and complexity using the known textile arts.

This change from isotropy to anisotropy is well matched to the stresses on the friction disc. Large OD/ID ratio friction discs require the greatest amount of isotropy to balance the frictional stresses and their mechanical reaction forces, especially at the lug/bolt attachment points. Thin annuli friction discs, on the other hand, produce reduced overall torque due to less active area producing friction. But the mechanical loads must be transmitted to the attachment points through thinner sections and these section thus require more stiffness to resist buckling. The changing isotropy of the chordal preform structure is well suited to this range of uses and mechanical loads.

Disposing the fiber as chords of a circle instead of as unidirectional tapes or fabrics provides an improved preform for the manufacture of carbon-carbon composites. Strength and stiffness of a composite are dominated by the orientation of the reinforcement fibers. The reinforcement fibers can only transmit forces efficiently in the direction of their alignment. If the reinforcement fiber is crimped or discontinuous, the stresses are transferred out of the reinforcement fibers and into the weaker and less stiff matrix. Thus, when unidirectional fibers are used, non-aligned or multi-dimensional forces must be transferred through the matrix to some degree causing loss of stiffness and possibly matrix and composite failure. Disposing the reinforcement fibers as chords of a circle provides reinforcement fibers in a wide range of directions which, though reducing the properties in a single direction compared to unidirectional lamina, can effectively transmit planar forces from any direction through the composite.

For example, a composite made up of tapes and fabrics can be constructed to be quasi-isotropic by stacking the tapes and fabrics and varying their orientation at the lamina level. However, because the tapes or fabrics stacked throughout the composite volume are non-isotropic, they create significant stress concentrations at the lamina interface. Non-isotropic lamina absorb the load on one interface and will try to transmit it through this interface to the stiffest attached material such as the next lamina of reinforcement fibers or the adjacent lug or bolt attached to the supporting structure. This method of interfacial load absorption and ability to localize transmission of the load can concentrate the stress at the point of transmission and increase the likelihood of failure. Stacks of non-isotropic reinforcements function in this manner with the most notable stress concentrations at the composite boundary, especially at highly stressed attachment points such as bolts and lugs. The present invention overcomes this problem by being comprised of reinforcement fibers disposed in a wide range of orientations at the lamina level so that the interlamina stress concentration is greatly reduced. This is due to the fact that the amount of stress that can be transmitted unidirectionally is limited by the tow size. Unlike the stacked layup in which the entire lamina transmits stress unidirectionally, the size of the area that can transmit unidirectional loads in the present invention is limited to the area of the particular tow disposed in that direction.

Carbon fibers have long been known, and methods for their production from a variety of precursors are well described in the art. Cellulosic precursors have been used for producing carbon fiber since the early 1960's, with rayon being the dominant carbon fiber precursor for nearly two decades. More recently, as the art has developed methods for producing carbon fiber derived from such materials as polyacrylonitrile (PAN) and pitch, the importance of rayon-based carbon fiber has declined. Polyacrylonitrile fiber, when oxidized and carbonized under appropriate conditions, provides tough, high strength, high modulus carbon fiber, and the overall conversion yield in producing fiber from PAN is good. Consequently, PAN fiber has been long preferred for fabricating preform structures.

Carbon fiber may also be readily produced from a mesophase pitch by spinning the molten pitch into fiber, oxidizing the pitch fiber by heating in air to form a thermoset fiber, and carbonizing by further thermal treatment in the absence of air. As is well known and understood in the art, the melt-spun pitch filaments are highly ordered structures comprising elongated, liquid crystal mesophase domains aligned with the filament axis. On carbonizing, these domains provide carbon or graphitic fiber with a high degree of crystalline order. Such highly ordered pitch-based fiber has generally been recognized as capable of providing carbon fiber having greater stiffness and higher thermal conductivity than carbon fiber from other sources, and carbon composites with a similar combination of properties and low or even negative coefficient of thermal expansion would find wide application. Moreover, thermoset mesophase pitch fiber is carbonized and graphitized in higher yield than other carbonizable precursor fibers such as rayon fibers, PAN fibers and oxidized PAN fibers, i.e., thermoset pitch fiber undergoes less reduction in weight when thermally processed. This in turn may lead to reduced shrinkage during carbonizing and graphitizing operations and minimize the concomitant creation of voids and internal stresses normally encountered with other fiber precursors. For these reasons, thermoset pitch fiber will be found particularly useful and desirable for use in the practice of this invention.

Preferably the thermoset pitch fiber is employed in the form of a continuous tow or yarn. Continuous fiber tow ordinarily comprises a plurality of filaments, usually from 1000 to 20,000 or more and may even exceed 300,000, with the axially-aligned filaments providing strength in the fiber direction of the tow. The thermoset pitch fiber is fabricated into a porous, three-dimensionally reinforced preform. Preferably, the fiber is formed into a thick, lesser density mat having the general shape of the part, with the continuous fiber oriented within the plane of the mat. Through-thickness reinforcement is added in a subsequent needlepunching operation. The preform is thus produced in the general shape of the final product, avoiding the need for cutting and shaping operations and thereby minimizing the substantial waste normally associated with such steps.

Figure 1:
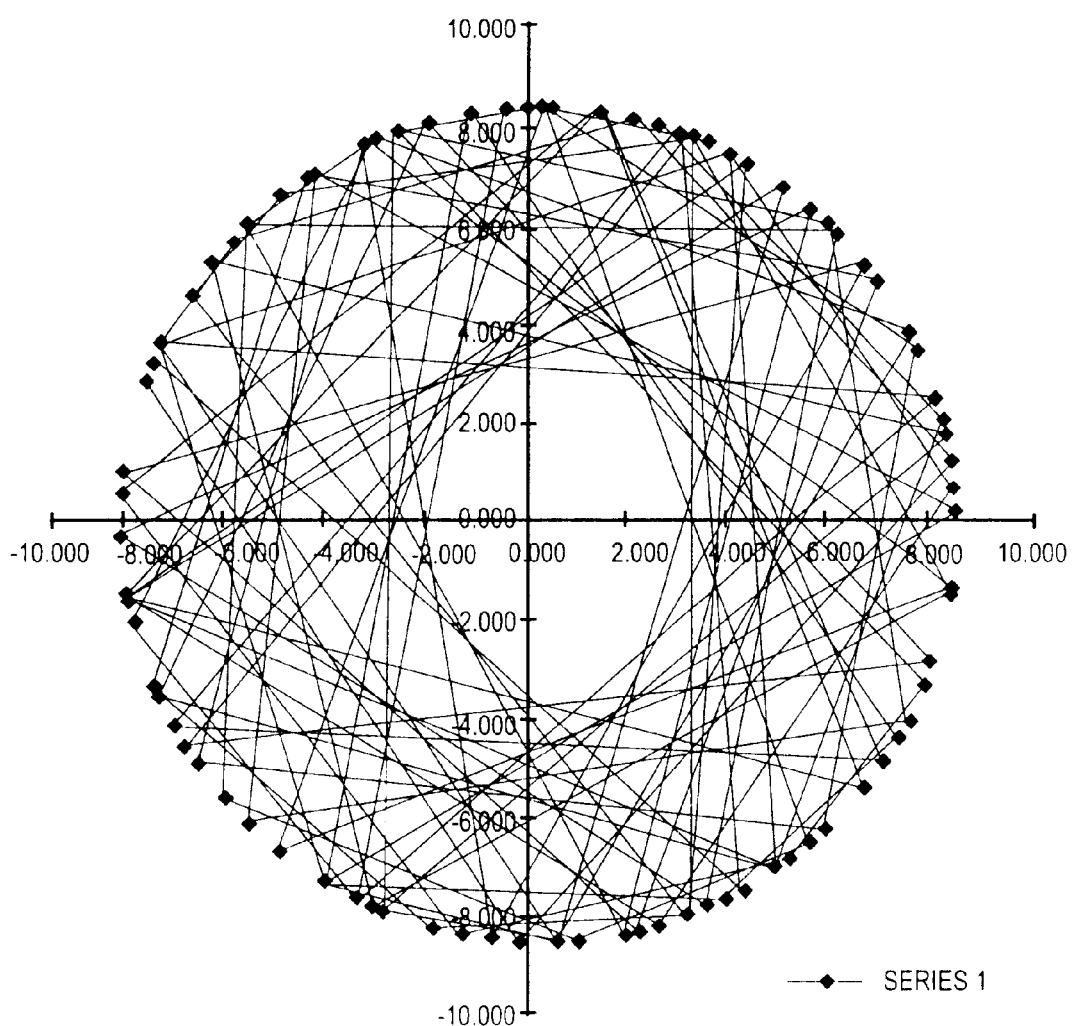
FIG. 1 Shows a partial wind pattern of chords around a circle.
Figure 2:
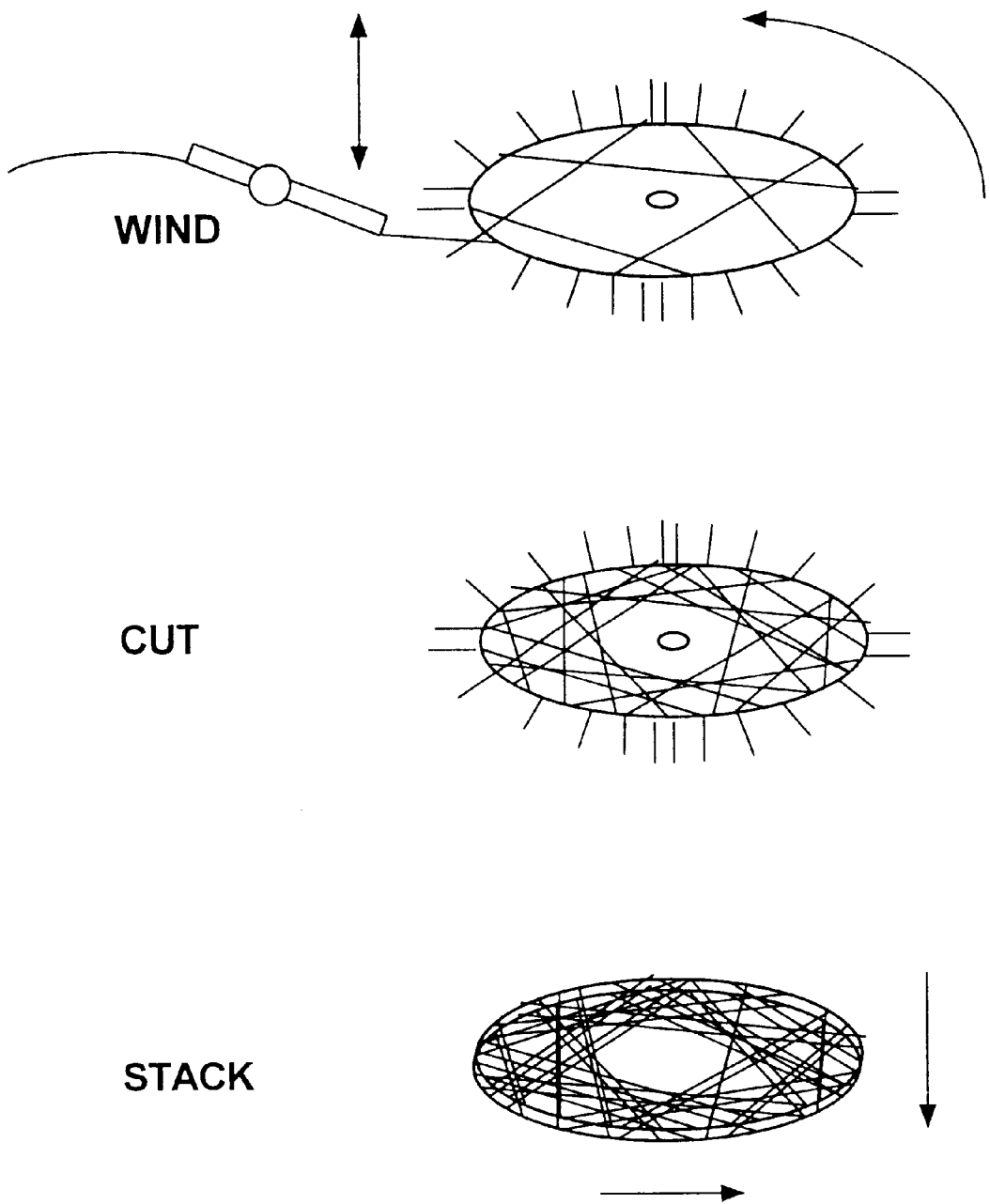
FIG. 2 Shows the steps of winding a preform using a mandrel with horizontal pins.

In one embodiment of the present invention, the continuous tows or yarns of fiber are disposed as chords of a circle around a pinned mandrel as shown in FIGS. 1 & 2. The number, sequence and angles of the chords are selected to fill the circle or annulus volume uniformly. Typically, ten to twenty angles are selected for the particular geometry of interest which will yield radial fiber areal weight uniformity within +/−2%. For example, an annulus with a geometry such that its Inner Diameter(I.D.)/Outer Diameter(O.D.) ratio is four may have one set of preferred angles while another annulus with an I.D./O.D. of five has a second set of preferred angles. The selected angles can be adjusted slightly or additional chords may be added to the wind sequence in order to ensure the angular fiber areal weight is also uniform.

The actual winding of the preform can be done manually, but preferably an automated process is used. The preform can be wound on several different mandrel styles, and mandrels of appropriate construction described in the art and known for use in winding continuous fiber structures may be suitably adapted for use in fabricating preforms according to the instant invention. For the purposes of further discussion, in describing the resulting structure, the mandrel plane will be designated as the x-y or in-plane orientation or direction, and the z or orthogonal direction will be understood to be the direction normal thereto, also termed the through-thickness direction.

Two possible styles are comprised of a circular mandrel with vertical or horizontal pins. When vertical pins—pins in the z-direction—are used, the fiber is wrapped around a pin which is designated angle 0°, the mandrel is rotated to the pin at the first of the selected angles and the fiber is wrapped around that pin to form the chord of a circle. That second pin is then designated angle 0°, the mandrel is rotated to the second selected chord angle, the fiber is wrapped around the pin and the process continues until the preform volume is uniformly filled with non-unidirectional fibers or tows. Once filled, the preform is removed from the mandrel in one piece. In Example 1, this process was done manually to create the preform. In Examples 2–4, a mechanized or automated system with horizontal pins was used.

The mechanized and automated apparatus described in the Examples utilizes a planar disc with radially extending pins in the x-y plane. However, vertically extending pins may also be used. A solenoid and an operator or Haas CNC rotary table, operate sequentially to set the tow position in the pins or move the mandrel to the next chordal position. A tube is used to feed the fiber through the pins so that the fibers are not damaged. The tube feeds the fibers from one planar surface of the disc to the other by alternating between an up and down position. The tube begins in an up position and the fiber is located by the pin at angle 0°. The mandrel rotates to the pin at the first selected angle and the tube drops into its down position. While the tube is in the down position, the mandrel rotates to the next selected angle. The tube is then raised to the up position. This process has the effect of creating the first chord angle on the top surface of the mandrel, the second chord angle on the bottom surface of the mandrel and the third chord angle on the top surface and so on until thousands of chord angles are complete and the preform is formed of non-unidirectional fibers or tows disposed around the mandrel. In this process the preform must be cut off the mandrel, repositioned to maintain register and stacked back together. Growth in the diameter during winding may require slight adjustments in the chord angles to provide a uniform fiber areal weight.

In both methods, the preform is initially formed using substantially continuous fibers or tows wound or wrapped around the mandrel. However, when using the vertical pin method, the preform does not have to be cut off the mandrel and can be removed in one piece. This provides a final preform with substantially continuous fibers throughout the entire volume of the preform. In the horizontal pin method, the fibers wrap around the outer diameter of the mandrel creating a pattern of fibers on both the top and bottom surface of the mandrel. This method requires the preform be cut off by slicing the preform along the outer diameter of the mandrel to form two separate pieces that are stacked back together to form the preform. This provides a preform with substantially continuous fibers across the preform, but discontinuous at the preform boundary. In other words the fibers are continuous from one edge of the preform to the other because they are formed as chords of a circle. It is important to note that it is the continuous nature of the fibers from edge to edge of the preform that is important for the present invention, and discontinuous fibers at the boundaries are satisfactory for most applications. Applications requiring continuous fibers at the boundaries, however, can be made using a vertical pin mandrel along with fixturing and densification techniques to retain fiber continuity and impart dimensional tolerances. For the purpose of the present invention, substantially continuous means that at least 50% of the fiber disposed as chords are continuous from edge to edge of the preform. More preferably 66%, and most preferably 75%.

As noted, it is preferred that the fiber tow be deposited in a manner that will provide uniform areal weight, giving a fiber mat having a density in the range of 0.3 to about 0.7 g/cc, preferably from about 0.5 to about 0.6 g/cc. While mats with densities outside these ranges may be useful in some applications, generally low-density mats having densities below about 0.3 g/cc are very light, almost fluffy structures. Such mats generally require considerable compaction in order to attain the bulk densities needed for most preform applications, which usually causes severe crimping of the fiber. Mats with densities greater than about 0.6 g/cc are difficult to achieve without extraordinary measures.

The chord angles selected for winding will determine the radial fiber areal weight which must be relatively uniform, preferably +/-2%, throughout the preform. The radial fiber areal weight can be determined by splitting the overall circle or annulus into thinner rings and calculating the length of each chord within each ring diameter. The lengths of fiber for all chords in each ring are totaled and divided by the incremental area of the ring to yield the fiber areal weight. The fiber areal weight for each ring is normalized and the difference from unity is used to change chord angles to stay within the preferred tolerance limits.

Figure 3:
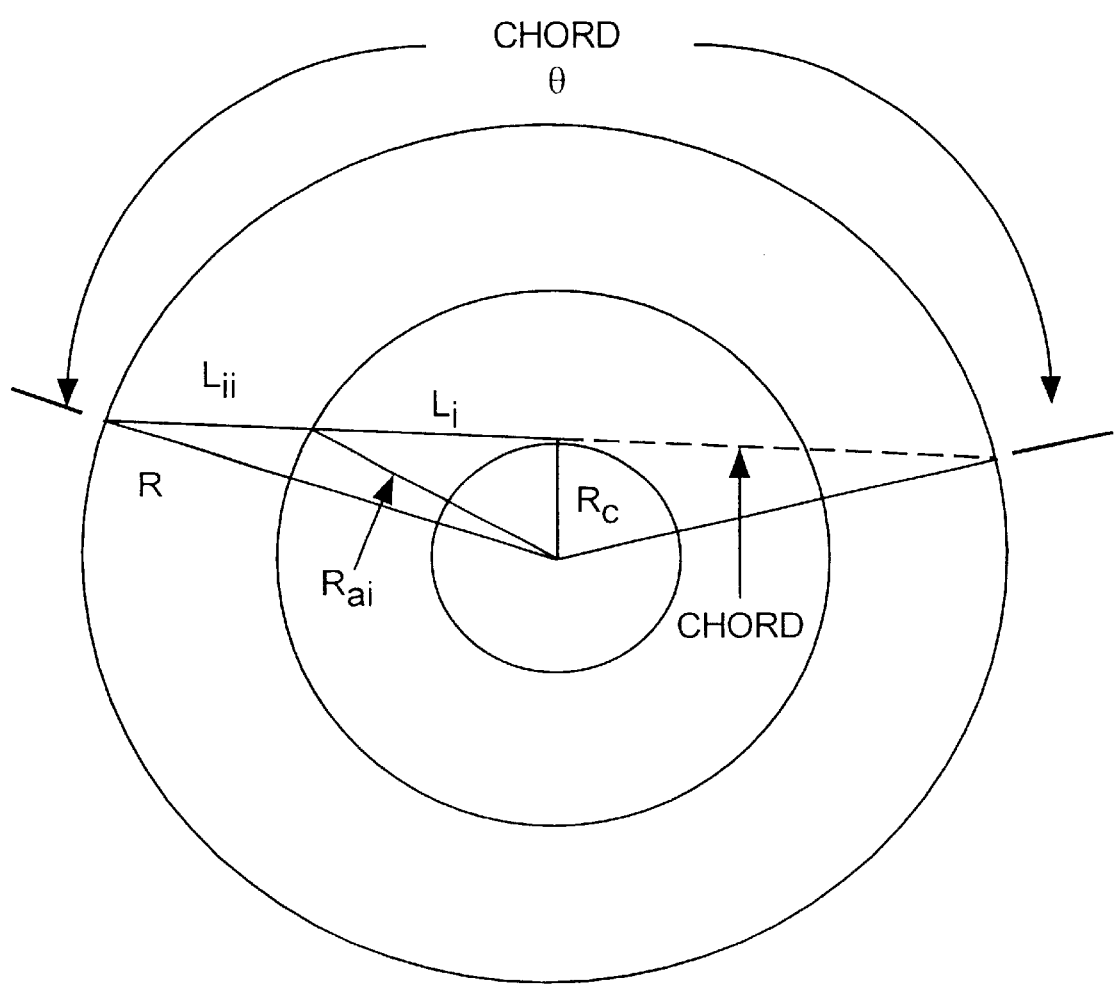
FIG. 3 Shows the method by which the radial fiber areal weight is determined.

The length of each chord within each ring diameter is calculated using basic geometric principals. It is well known that the square of the hypotenuse of a right triangle is equal to the sum of the squares of its two legs (e.g. $a^2+b^2=c^2$). Thus, to determine the length of any one leg, the lengths of the remaining two must be determined. Applying this to the present invention, the radial fiber areal weight can be determined. As shown in FIG. 3, the radius of the incremental annulus ($R_{ai}$) is predetermined. The chord radius ($R_c$) can be calculated from $R_a$ which is the O.D./2, and chord angle θ from the equation ($R_c$=O.D./2×Cos(θ/2)). From these lengths, the length of the fiber falling within a particular annulus ring is calculated. This calculation process is easily accomplished using available software (e.g. Microsoft Excel®), a tabulation of these values is shown in Table I. The chordal angles and O.D. for a particular preform are entered into the spreadsheet which calculates geometric quantities and summarizes the contribution to the fiber areal weight on an incremental annulus basis. Splitting the overall annulus into thinner rings, these calculations iteratively find the length of the chord within each ring diameter and subtract off the inner ring lengths. The lengths of fiber for all chords in each ring are totaled and divided by the incremental area of the ring to yield the radial fiber areal weight. The radial fiber areal weight for each ring is normalized and the difference from unity is used to change chord angles to stay within tolerance limits required.

The second part of setting a chord sequence is to plot the accumulation of wound fiber around the annulus to determine the uniformity of the angular fiber areal weight which is the areal weight of fiber contained within thin wedges of the circle. This was done by converting the intersections of the cumulative angle of the chords on the circumference into X, Y coordinates and plotting them as a X, Y scatter chart with connecting lines using available software as in FIG. 1. This visual representation of the final wound article shows areas of high and low fiber density. Again, small changes in angles, their wind sequence, or the addition of small adjustment angles were used to achieve uniform angular fiber areal weight. FIG. 1 is a small portion of the several thousand chords used in a winding; the non-uniformities seen are corrected by the full winding sequence shown in FIG. 5. FIG. 1 shows how the reinforcement fibers are disposed in a wide range of orientations at the lamina level. Several sets of these angles, each offset by their non-repeating cumulative total, are required to fill the volume normally associated with a single lamina which is about 0.005 to 0.100 inch thick. Quality assurance is achieved by contour gaging of the final part to ensure uniform thickness at a given pressure and footprint.

In another embodiment of the present invention, a preform is fabricated such that different angle sequences are selected for different planes of the preform so that the properties needed at the various planar levels of the brake disc are optimized. This embodiment retains the balanced, symmetric and substantially isotropic nature as a composite overall, but the fine dispersion of reinforcement fiber orientation at the lamina level is replaced with a balanced +/- angle orientation. For example, all the chords of one large angle can be grouped at the central plane to form a disc with superior torque properties to handle the mechanical loads, while circumferential chords that produce desirable friction or wear characteristics can be located to occupy the wear surface of the friction disc. Chord angles can be located in this manner because angle combinations filling the preform ID form only a small fraction of the material at the OD because the OD has a much greater circumferential area than the ID. In other words, the annular surface area of the preform increases with radius. Thus, fibers disposed as chords of a circle to fill the ID will overlap and accumulate significantly near the ID while remaining relatively spaced apart in the OD. This is known as radial thinning.

Radial thinning allows one to design the preform so that the angles of the reinforcement fiber at a given thickness are different at the ID, center, or O.D. to better match the physical requirements of the friction disc. For example, long fiber chords that cut across the ID can be disposed in the center plane of the preform. These fibers will accumulate and cause fiber build-up in the ID and thin out at the OD. Because the OD has a thinner layer of fibers, short circumferential chords can be disposed near the OD at a specified plane of the preform to make up for the radial thinning effect. The order in which a preferred group or groups of chord angles is wound specifies the plane in the preform the group occupies and the order is selected so that the group will ultimately become the wear layer on the outer surface of the preform. Thus, the optimum fiber orientation for friction can be located at the central wear surface of the annulus while retaining balanced, symmetric and substantially isotropic composite construction, especially at the I.D and/or O.D. where lugs and/or bolts are used for attachment.

Figure 6:
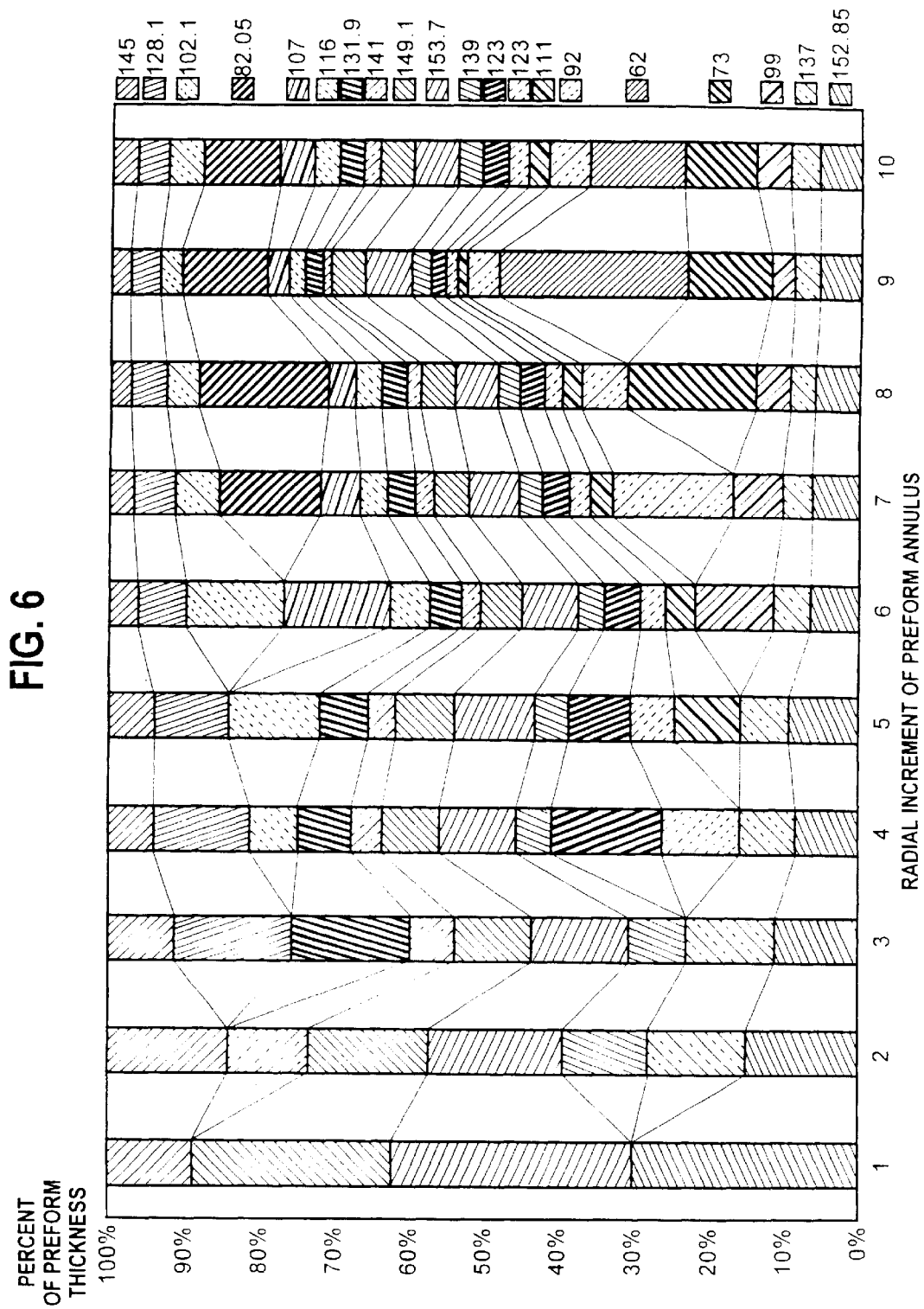
FIG. 6 Shows a graphical representation of a stacked quarter cross section of the preform wound in Example 6.

FIG. 6 provides a graphical representation of a stacked chordal angle construction showing the quarter cross section of the annulus and disclosing the variety of chord angles that can be disposed at different planes of the preform. The left hand side of chart represents the ID of the preform and the right hand side represents the OD and the horizontal axis is the preform centerline. As shown in Tables 6B, 6C and FIG. 6, the ID is comprised of fibers disposed at 4 chord angles— 145°, 149.1°, 153.7° and 152.85°. Approximately 11% of the fiber is disposed at 145°, 26.5% at 149.1°, 32.5% at 153.7° and 30% at 152.85°. As the bar graph of the preform progresses from the ID to the OD, the variety of chord angles used increases to 20 and short circumferential chord angles, such as 62°, 73° and 92°, are added at selected planes of the preform to maximize their effectiveness as structural reinforcement or as the wear layer.

The chordal mat produced in the initial operation will generally have a thickness in the range of from about ½ inch to about 4 inches, preferably from about ¾ inch to about 3 inches for most applications. Mat thickness will be limited in part by practical considerations. In particular, the mat is intended to be further modified to provide three-dimensional reinforcement in a needlepunching operation. Such needling operations generally require the use of needles of a length sufficient to penetrate over 90% of the thickness of the mat. For mats with excessive thickness, the force needed to penetrate to the desired depth may result in frequent needle breakage. In addition, needles able to penetrate to depths of 4 inches and more are generally not available from commercial sources and must therefore be custom made, adding to the cost of preform fabrication.

Needling operations are conventional in the non-woven textiles art, and generally are practiced using a plurality of needles comprised of a shank having outward projecting barbs. The needles are mounted to permit their use in tandem in the needling operation, the needlepunching being accomplished by moving the needles normally with respect to the mat surface, and in a reciprocating manner, thereby forcing the needles repeatedly into or through the mat. The barbs catch fiber in passing through the mat, causing a portion of the fibers in the mat to become aligned vertically. The mat is moved incrementally between needle penetrations to uniformly felt the mat.

For the purposes of this invention, the needles will preferably be selected to be of sufficient length to pierce the low density mat substantially through, preferably from 80 to greater than 100% through, the mat in the needled direction. The needle density will be selected to provide vertical fiber orientation at densities adequate for reinforcement of the preform in the thickness direction. In the practice, the needles will be set at spacings of from 0.9 to 1.2 cm on center, other needle densities can be used as appropriate for the final product.

The needlepunching operation will generally reduce the initial thickness of the fiber mat by from 10 to 40%, depending upon the degree of needlepunching applied. For most applications the level of needlefelting employed will be sufficient to reorient substantial quantities of fiber, thereby giving the structure three-dimensional reinforcement and may result in three-dimensional isotropic property characteristics. The strength properties and preform integrity will be significantly improved through needlefelting, permitting subsequent handling including storage, packaging and shipping, as well as use in impregnating and infiltration operations without requiring further fixturing.

To attain greater uniformity in the needled structure, particularly for mats and similar substantially planar structures, it may be desirable to needle punch the structure from both faces by inverting the structure and presenting the opposing face for additional needlepunching operations or by alternating needling from one side to the other. As will be better understood by way of being exemplified herein below, when combined with controlled variation in the depth of the needlepunching, the technique of needlepunching from both faces also affords means for controlling the degree of reinforcement within the structure, thus providing structures having different levels of reinforcement through the thickness.

Typically, in operation, a portion of the filaments making up the mat will be caught by the barbs and reoriented as filament bundles in the z or thickness direction. The portion of the filaments not caught by the barbs will be displaced laterally within the x-y plane by the needles, creating openings through the structure to the depth of the needling. The filament bundles created by the needlepunching will vary widely in number of filaments, depending upon the initial makeup of the fiber tow and on the level of needlepunching employed. Structures comprising filament bundles with from 25 to 1000 filaments will be readily produced, while structures with bundles having as few as 10 to 75 filaments or bundles comprising from 250 to as many as 4,000 may also be observed.

The repeated piercing in the needlepunching operation serves to compact and thereby densify the structure to some degree while at the same time spreading fiber within the plane of the disc. This working of the fiber tow smoothes the progression in fiber orientation between adjacent areas. As noted, the needles employed are selected to provide openings or channels of significant size through the mat, with reoriented tow filaments extending through the channels. The large channels increase the effective porosity of the structure and provide improved access to the interior of the mat, increasing the level of carbon deposition that can be accomplished in subsequent carbon infiltration operations or for impregnation with suitable carbon precursor materials. The improved porosity is particularly beneficial in the production of thick parts, generally greater than 1 inch, because during the infiltration of low porosity preform structures with the matrix component, such as, for example, CVD carbon, deposition tends to occur at the surface layers, blocking further densification within the interior of the structure.

In accordance with one embodiment of the present invention, the chordal preform is produced by needling the continuous fiber mat. In this embodiment, the barbs catch the continuous tows causing them to realign in the vertical direction. While this causes some breakage of the reinforcing filaments, the continuous tow construction maintains the maximum degree of fiber length, alignment and, subsequently, composite properties.

In another embodiment, chopped tow fiber is distributed over the surface of the chordal preform. The chopped fiber supplies easily entrained fiber to fill the needle barbs. This sacrificial fiber minimizes damage and reorientation of the chordal structure. This embodiment has additional advantages in that a second type of fiber may be used as the chopped fiber to create a hybrid composite. For example, PAN fiber can be used as the continuous fiber in the x-y plane and Pitch fiber as the chopped fiber which is needled and realigned in the z-direction or vice versa. Segregating the fibers by orientation enables the preform designer to optimize performance criteria that have directionality i.e. through thickness conductivity.

The needle-punched thermoset pitch fiber preform will generally be carbonized to provide a porous carbon structure or preform for use in the infiltration or impregnating and carbonizing operations used to complete the production of a high-strength, fiber-reinforced carbon or graphite composite article. Carbonizing processes such as are commonly employed in the art for such structures may be used for these purposes. Generally, the preform may be carbonized without the need for fixturing by heating in an inert, non-oxidizing atmosphere at a heating rate selected on the basis of the size of the preform and the materials of construction. Heating rates in the range of from about 25 to 100° C. per hour up to the final temperature are commonly employed in the art, and the preform may be held at a selected final temperature for varying periods of from several minutes to several hours to complete the carbonization, the time and temperature depending upon the degree of carbonization desired. Such processes will be familiar to those in the carbon fiber art. For most preforms from thermoset pitch fiber precursors, the carbonizing operation will result in a shrinkage in the range of 3–10%. The carbonized preforms generally will have a nominal bulk density in the range 0.4 to 0.7 g/cc.

Although the discussion focuses on the use of continuous pitch fiber, one skilled in the art would understand that other fibers, such as PAN, glass, and high strength resin fibers could also be used as the continuous fiber wound about the mandrel to create the chordal preform. The chordal preform would then be embedded in an appropriate matrix material.

The porous carbon structures of this invention, when embedded in any of a variety of matrix materials, including thermoset and thermoplastic resins, metals, carbon and ceramics, provide particularly attractive composites. A great variety of thermoset resin systems and formulations suitable for use as matrix resins in the manufacture of carbon fiber reinforced composites are known and readily available from commercial sources, including epoxy resins, cyanate resin, phenolic resins, bismaleimide resins and the like, as well as mixtures and reactive intermediates based thereon. Most such thermoset resins, when formulated to be liquid at the application temperature and with a viscosity sufficiently low for impregnation of porous matrices, will be found to be useful with the porous carbon structures of this invention in producing composites. Though generally more difficult to utilize, appropriate thermoplastic resins and the preferred processes for infiltration will also be found useful for the fabrication of composite articles using the articles of this invention. Similarly, methods and processes for infiltrating porous carbon bodies with molten metals, including copper, aluminum, tin, silver, nickel and the like, as well as alloys such as brass, have been developed and are known in the composite arts and these methods may be employed with the porous carbon preforms of this invention for producing metal matrix composites. Methods for accomplishing the infiltration of a variety of porous structures with ceramic materials and precursors, including silica, silicon carbide and silicon nitride as well as with a variety of other nitrides, oxides and the like are well described in the art, and these also may be suitably adapted for use with the carbon preforms of this invention to provide ceramic-carbon fiber composites.

When used for producing carbon-carbon fiber composite, the porous carbon structure will be subjected to infiltration operations, for example, the pyrolytic deposition and infiltration processes commonly employed in the carbon matrix composite art. Generally, the operations are conventional, and may be accomplished in any suitable vapor deposition furnace having a temperature range of between about 700° C. to about 1900° C. For example, pyrolytic carbon may be deposited from a carbonaceous gas such as methane, ethane, propane or butane which disassociates under the influence of heat. The carbonaceous gas is preferably diluted with an inert gas, for example nitrogen or argon, to facilitate penetration of the article. Generally a ratio of from about 1 part by volume of carbonaceous gas to about 10 parts by volume of inert gas is suitable to use. A ratio of from about 1:1 to about 1:6 has been found eminently useful. The carbonaceous gas may be fed into an evacuated furnace and in such case the diluent gas may be eliminated or the amount of inert gas used can be considerably reduced.

The period of time needed to effectively infiltrate the shaped porous carbon structure depends upon various factors such as the structure's volume, porosity, density, structural shape, fiber size and fiber orientation as well as on the flow rate of the gas, the deposition temperature and the furnace pressure.

These variables may be empirically determined according to the common practice in the art for the manufacture of carbon composites. After vapor infiltration, the assembly is allowed to cool and, if desired, the process will be repeated to further increase the carbon content and the density of the carbon composite article.

Alternatively, the porous carbon preform may be pressure impregnated with a suitable carbonizable filler material, such as pitch or a carbonaceous resin. The article may then be pressure cured, and, after curing, baked using a protective atmosphere of nitrogen at atmospheric pressure. During the baking operation, the temperature of the body is gradually raised from the curing temperature up to 1000° C. The rate of temperature increase is largely a function of the size of the article to be baked. Large articles may require a slower rate of temperature increase than smaller articles in order that the temperature be uniform throughout the article, thus avoiding harmful internal stresses that are caused by uneven heating of the article. After completion of the impregnating, curing and baking steps, the shape may again be placed under vacuum and reimpregnated, cured and baked. The number of impregnation, curing and baking cycles is determined by the density that is desired in the finished article.

After completion of the desired number of impregnation, curing and baking steps, the article may be carbonized or graphitized. Thermal treatment may be conducted in a single heating step or in stages to a temperature in the range of 1200°–3500° C. to produce carbonized and graphitized carbon articles of this invention. The heat treatment will be conducted in a substantially non-reactive atmosphere to ensure that the article is not consumed. The non-reactive atmosphere may be nitrogen, argon or helium; however, for temperatures above about 2000° C., argon and helium are preferred. Although the non-reactive atmosphere may include a small amount of oxygen without causing serious harm, particularly if the temperature is not raised too rapidly, the presence of oxygen should be avoided. In addition, wet yarn structures will produce an atmosphere of steam when heated, which should be purged from the furnace before carbonizing temperatures are reached inasmuch as steam is highly reactive at such temperatures. It may be desirable to include boron or similar graphitizing components in the furnace atmosphere and these will be regarded as non-reactive as the term is used herein.

The heating of the preform may be carried out as a single step process or, alternatively, conducted in a series of steps or stages, with cooling and storage of intermediate materials such as filled preforms and carbonized structures for further processing at a later time. The final temperature of the heat treatment will be determined primarily by the end use application. For example, where it is envisioned the article will encounter extreme temperatures, the heat treatment may be conducted to very high temperatures, 2600° C. and greater, and even to temperatures approaching 3500° C. for applications where a high degree of graphitization is desired. The heat treatment may be carried out with or without applying external pressure to assist the compaction and afford higher density composites.

It will be readily understood by those skilled in the art that the particular thermal processing to be employed will be determined with respect to the size and geometry of the part that is being produced.

For large parts, heat conduction into the center of the part will necessarily be slow, and long heating cycles and slow increases in temperature may be desirable.

Although it is within the scope of this invention to produce reinforced carbon-carbon fiber or graphitized articles with lower density, for example under 1.4 g/cc, the preferred density range will lie in the range of from about 1.6 to about 2.1 g/cc. Carbon-carbon fiber composites according to the invention will have excellent thermal conductivity, due in substantial measure to the use of continuous pitch-based fiber in fabricating the fiber preforms. The particular thermal conductivity observed will depend in part on the final carbonizing temperature, which in turn determines the degree of graphitization. When carbonized at a temperature of greater than 2000° C., composites having a density greater than 1.6 g/cc and comprising the carbonized preforms embedded in a carbon matrix according to this invention may have a thermal conductivity greater than 80 watts/m °K in the through-thickness direction.

The invention will be better understood by consideration of the following specific examples illustrating more clearly the exact manner in which the processes of the present invention may be carried out. The examples are provided by way of illustration only, and are not to be construed as limiting the scope of the invention to the particular process details or articles illustrated.

EXAMPLE 1

A preform was fabricated using 2,000 filament tows of air oxidized thermoset mesophase pitch fiber, which is an intermediate form of P25 Thornel® carbon fiber. A vertical mandrel with 12.5 inch pin diameter was strung using the chord sequence of Table 2 to form a preform with an outer diameter (O.D.) greater than 12 inch, an inner diameter (I.D.) of about 4 inches and a thickness of about 1.6 inches. After four sets of single tow winding, three tows were wound side by side until a total of 84 sequences of a single tow were complete. The wound mat was removed from the mandrel and 200 grams of de-ionized water were added to improve handleability and needlefelting compaction. The total weight of the mat and water was 2034 grams. The ID was trimmed to fit in the needling mold resulting in a wet weight of 1900 grams.

The mat was put into an annular mold of 4.63" I.D. and 12.63" O.D. of sufficient depth to insert an annular compaction shoe with a clearance fit to the I.D. and O.D. The needlefelting was conducted in accordance with U.S. Pat. No. 5,705,008 which is herein incorporated by reference. The shoe was lowered to a interior height of 1.48". Needlefelting needles, Foster F20 8-22-3B 2B/E 15×18× 36×3.5 SBAs, distributed in a radial pattern of 4.59 needles/ sq. inch mounted on a slotting head were adjusted to penetrate to within 0.025" of the back side of the mat to entangle the fibers. The mat was felted to 733 penetrations per square inch (NPSI) while rotating at 0.4 rpm. The mat was then flipped and felted to 775 NPSI. The preform was examined, and the needlefelting sequence repeated for an additional 947 NPSI per side to yield the final needlefelting density of 1721 NPSI per side.

The preform was carbonized by heating in a nitrogen atmosphere, increasing the temperature at a rate of 50° C./hr to 800° C.; and 75° C./hr to 1235° C. with a hold time of one hour at that temperature. The carbonized preform was solid with good integrity. Shrinkage, and mass and water loss resulted in a final weight of 1,223 grams, an ID of 4.055", an OD of 11.90" and a thickness of 1.39". Bulk density was 0.55 g/cc.

This preform was densified using chemical vapor infiltration to form a Carbon/Carbon article with a density of 1.70 g/cc. It was substantially isotropic with a circumferential tensile strength and modulus of 4.4 ksi and 4.9 msi and a radial tensile strength and modulus of 3.9 ksi and 5.5 msi, respectively.

EXAMPLE 2

A preform was fabricated using 4,000 filament tows of air oxidized thermoset mesophase pitch fiber, an intermediate form of P25 Thornel® carbon fiber. A horizontal mandrel with 12.5 inch diameter with radially extending pins was strung using the chord sequences of Table 3 and, later, Table 4 to create a preform with an outer diameter greater than 12", and an inner diameter of about 4" and a thickness of about 1.6". Solenoid actuated guide tubes were used to string the fiber tows through the pins wrapping the same sequence of tows on both the top and bottom side of the mandrel. The chord angles were tracked with a rotary encoder to ensure cumulative accuracy.

After seven sets of single tow winding, two tows were wound side by side until a total of 21 top and bottom chord sequences of a single tow were complete. An adjustment to the chord angles was made after sequence 9 to counteract the diameter shift caused by fiber building up on the outer edge of the mandrel. The wound mat was removed from the mandrel and stacked after the 8th, 10th, 12th, and 14th sequence to limit O.D. growth during winding. De-ionized water was added to improve handleability and needlefelting compaction. The mat was trimmed to fit in the 12.625" mold and stacked to full thickness. The mat was placed into the mold and needled as in Example 1 for 2237 NPSI total. The final needlefelted preform was stiff, dense and flat. The I.D. was die cut to 4.36", the O.D. was 12.66", the thickness 1.58" and the weight (wet) was 2010 grams.

The preform was carbonized by heating in a nitrogen atmosphere, increasing the temperature at a rate of 50° C./hr to 800° C.; and 75° C./hr to 1235° C. with a hold time of one hour at that temperature. The carbonized preform was solid with good integrity. Shrinkage, and mass and water loss resulted in a final weight of 1,310 grams, an ID of 4.10", an OD of 12.12" and a thickness of 1.49". Bulk density was 0.524 g/cc.

This preform was densified with a low modulus epoxy resin (EPON 828/Jeffamine 230) and mechanically tested yielding a tangential tensile strength and modulus of 12.8 ksi and 2.3 msi, respectively. Using a value of 0.45 times the uni-directional composite modulus to estimate the isotropic modulus of a planar isotropic composite, the translation efficiency of tensile modulus can be calculated by the following equation:

Translation efficiency (%)=(measured axial modulus/calculated modulus)×100

Calculated modulus=[Fiber modulus×planar fiber volume fraction×planar isotropic factor]

Fiber modulus=25 msi (P25 fiber)

Planar fiber volume fraction=0.524 g/cc preform/1.93 g/cc fiber–'Z' fiber

'Z' fiber estimate=10% (0.025 volume fraction)

Translation efficiency=2.3/(25 msi×0.244 Vff planar×0.45)×100=83.7%

EXAMPLE 3

A preform was fabricated using six 4,000 filament tows of air oxidized thermoset mesophase pitch fiber. A horizontal mandrel with 18.9 inch diameter with radially extending pins was wound using the 99 chord sequence of Table 5. Two sets of three parallel guide tubes driven by solenoids were used to string the fiber tows through the pins simultaneously wrapping the chord sequence of chords on both the top and bottom side of the mandrel. The chord angles were tracked with a rotary encoder to ensure cumulative accuracy. A total of 44 six tow sequences were used, intermediate mats of twelve sequence thickness were cut off and stacked to limit O.D. growth during winding.

De-ionized water was added to improve handleability and needlefelting compaction. The mat was trimmed to fit in a 19.1" I.D. mold. The mat segments were placed into the mold containing 150 grams of uniformly distributed 4 inch long chopped fiber, and covered with 150 grams of the same. In a production machine utilizing the process of U.S. Pat. No. 5,705,008, the mat was alternately needled from both sides with Foster F20-9-32-8NK/LI/CC/BL 30MM 15×18× 25×4×4 CB needles as it was incrementally rotated between needle insertions. The needle stroke was adjusted to 0.035" less than through penetration and the total NPSI achieved was 750 per side. The final needlefelted preform was stiff, dense and flat with the chopped fiber preferentially driven into the felt. The preform had an I.D. of 6.68", O.D. of 19.1", the thickness was 1.475" and the weight (wet) was 4676 grams.

EXAMPLE 4

A preform was fabricated using three 2,000 filament tows of air oxidized thermoset mesophase pitch fiber. A horizontal mandrel with 7⅞ inch diameter with radially extending pins was wound using the chords of Table 6 A and the sequence of Table 6C. Three parallel guide tubes were used to string the fiber tows through the pins wrapping the sequence of chords on both sides of the mandrel. The chord angles were programmed into and actuated by a Haas HASC CNC rotary indexer and the yarn threaded through the pins with a 45 degree stroke Lucas rotary solenoid linked by a programmable logic controller. The 990 chord sequence was completed and the mat cut off the mandrel and re-assembled maintaining its original orientation of top and bottom winding.

Figure 5:
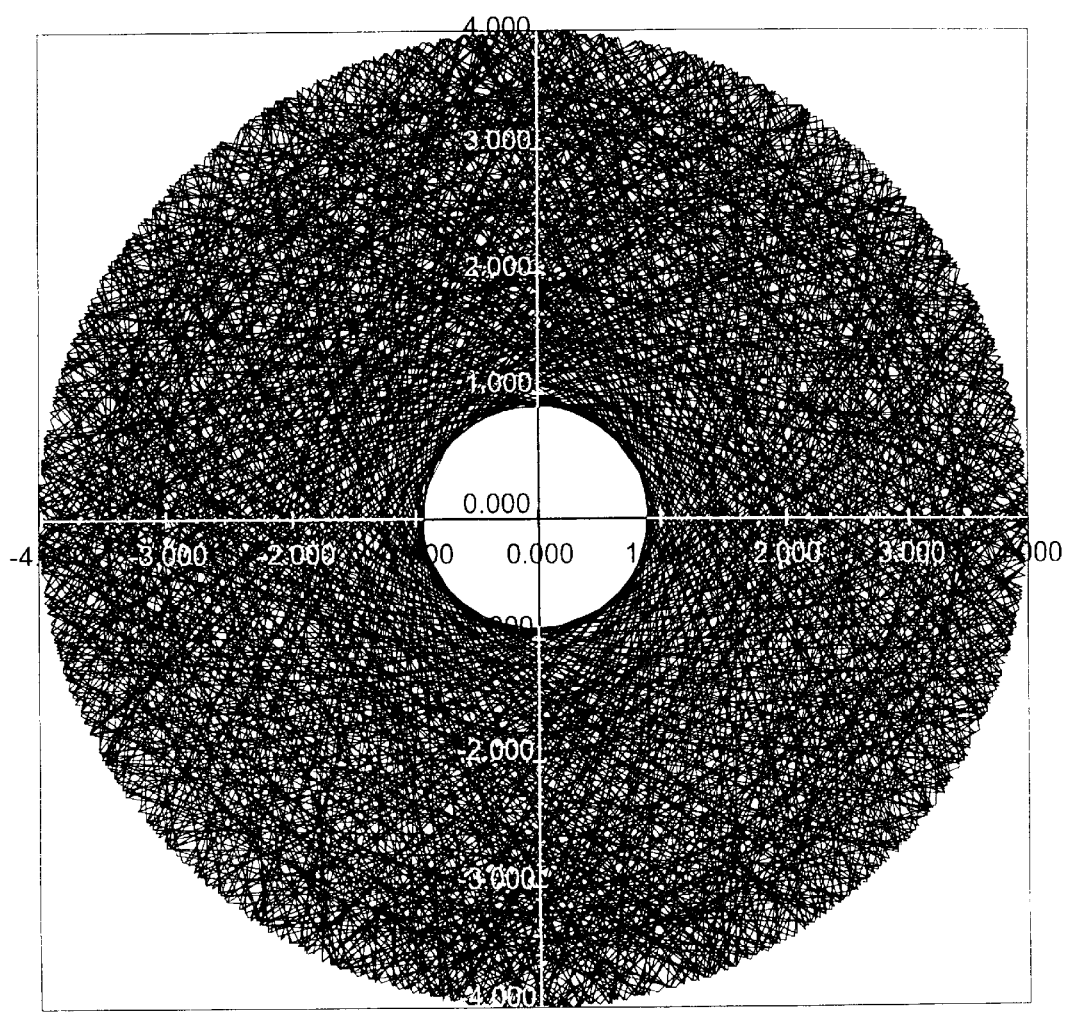
FIG. 5 Shows the full pattern plot of fibers disposed at all the chord angles used in Example 4.

Table 6A, 6B and FIG. 6 describe the structure of the preform. The first column of 6A is the number of times each chord is used to uniformly fill in a preform per side of the mandrel. This is different than previous example sequences which utilize the same number of each chord angle. Table 6B contains the percentage of fiber filling an incremental annulus for each chord angle. Table 6C adds a sorting value to each chord angle and is used to generate FIG. 6 which is a quarter cross section of the preform illustrating the build of the mat. The sort numbers of each chord are adjusted to put a particular chord or set of chords at a desired thickness in the final preform where they will be most effective in the preform, composite structure. FIG. 5 is the full pattern plot of fibers disposed at all the chord angles used in Example 4.

De-ionized water was added to improve handleability and needlefelting compaction. The mat was trimmed to fit in a 7.8" I.D. mold with a felt bottom and shim stock sidewalks. Needlefelting needles, Foster F20 8-22-3B 2B/E 15×18× 36×3.5 SBA, distributed at 3.225 needles/sq. inch in a random, orthogonal pattern mounted on a slotting head were adjusted to penetrate 0.196 inch through the back side of the mat to entangle the fibers. The mat was felted to 650 penetrations per square inch (NPSI), flipped, and felted again to 650 NPSI.

The final needlefelted preform was stiff, dense and flat. The physical dimensions of the preform were: I.D.=1.50", the O.D. was 7.9", the thickness 0.41" and the weight (wet) was 225 grams. The preform was carbonized by heating in a nitrogen atmosphere at a rate of 50° C./hr to 800° C.; and 75° C./hr to 1235° C. with a hold time of one hour at that temperature. The carbonized preform was solid with good integrity. Shrinkage, and mass and water loss resulted in a final weight of 136 grams, an ID of 1.25", an OD of 7.6" and a thickness of 0.35". Bulk density was 0.55 g/cc.

This preform was densified using chemical vapor infiltration to form a Carbon/Carbon article with a density of 1.81 g/cc. Articles produced similar to this piece were evaluated and found to have good strength and desirable friction for high energy friction disc applications.

Comparative Example 1

A preform was fabricated in accordance with U.S. Pat. No. 5,705,008 using 2.5 inch chopped fiber formed into a mat in the mold of Example 2. The preform was compacted by the shoe and needlefelted with the needles of Example 2 for 1750 NPSI per side. The preform was carbonized as in Example 2 and resulted in a density of 0.61 g/cc.

This preform was densified with a low modulus epoxy resin (EPON 828/Jeffamine 230) and mechanically tested yielding a tangential tensile strength and modulus of 10.6 ksi and 2.3 msi, respectively. The translation efficiency calculation was used to compare its performance to Example 2.

Translation efficiency (%)=(measured axial modulus/calculated modulus)×100

Calculated modulus=[Fiber modulus×planar fiber volume fraction×planar isotropic factor]

Fiber modulus=25 msi (P25 fiber)

Planar fiber volume fraction =0.61 g/cc preform/1.93 g/cc fiber–'Z' fiber

'Z' fiber estimate=10% (0.025 volume fraction)

Translation efficiency=2.3/(25 msi×0.284 Vff planar×0.45)×100= 71.9%.

The chordal composite achieved a 16.4% increase in stiffness.

TABLE 1

Fiber Areal Weight Calculation

| Outer Diameter | | | 12 | | | | | | | | | | | | | | | | | | | | | | | |
|---|---|---|---|---|---|---|---|---|---|---|---|---|---|---|---|---|---|---|---|---|---|---|---|---|---|---|
| Inner Diameter | | | 4 | | | | | | | | | | | | | | | | | | | | | | | |
| | | | | | | inches | | | | | | | | | | | | | | | | | | | | |
| | | | | | | inches | | | | | | | | | | | | | | | | | | | | |
| No. of tows/ Band | Chord angle | Chord angle radians | Chord radius | Length Chord/2 | Chord Length 0–2 R 2 | % of chord 0–2 R | Chord Length 2–2.5 R 2.5 | % of chord 2–2.5 R | Chord Length 2.5–3 R 3 | % of chord 2.5–3 R | Chord Length 3–3.5 R 3.5 | % of chord 3–3.5 R | Chord Length 3.5–4 R 4 | % of chord 3.5–4 R | Chord Length 4–4.5 R 4.5 | % of chord 4–4.5 R | Chord Length 4.5–5 R 5 | % of chord 4.5–5 R | Chord Length 5–5.5 R 5.5 | % of chord 5–5.5 R | Chord Length 5.5–6 R 6 | % of chord 5.5–6 R |
|---|---|---|---|---|---|---|---|---|---|---|---|---|---|---|---|---|---|---|---|---|---|---|
| 1 | 36 | 0.62832 | 5.7063 | 1.8541 | 0 | | 0 | | 0 | | | | | | | | | | | | 1.8541 | 1 |
| 1 | 61 | 1.06465 | 5.1698 | 3.04523 | 0 | | 0 | | 0 | | | | | | | | | | 1.8771 | 0.6164 | 1.682 | 0.3836 |
| 1 | 78 | 1.36136 | 4.6629 | 3.77592 | 0 | | 0 | | 0 | | | | | | | | 1.8049 | 0.478 | 1.1119 | 0.2945 | 0.8591 | 0.2275 |
| 1 | 94 | 1.64061 | 4.092 | 4.38812 | | | | | | | | | | | 1.8723 | 0.4267 | 1.0009 | 0.2281 | 0.8017 | 0.1827 | 0.7131 | 0.1625 |
| 1 | 108 | 1.88496 | 3.5267 | 4.8541 | | | | | | | | | 1.8874 | 0.3888 | 0.9076 | 0.187 | 0.7493 | 0.1544 | 0.6761 | 0.1393 | 0.6336 | 0.1305 |
| 1 | 120 | 2.0955 | 3 | 5.19615 | | | | | | | 1.8028 | 0.3469 | 0.843 | 0.1622 | 0.7084 | 0.1363 | 0.6459 | 0.1243 | 0.6098 | 0.1174 | 0.5864 | 0.1128 |
| 1 | 131 | 2.28638 | 2.4882 | 5.45977 | | | | | 1.676 | 0.307 | 0.7855 | 0.1439 | 0.6704 | 0.1228 | 0.6176 | 0.1131 | 0.5874 | 0.1076 | 0.5681 | 0.104 | 0.5548 | 0.1016 |
| 1 | 138 | 2.40855 | 2.1502 | 5.60148 | | | 1.2754 | 0.2277 | 0.8166 | 0.1458 | 0.6696 | 0.1195 | 0.6113 | 0.1091 | 0.5801 | 0.1036 | 0.561 | 0.1002 | 0.5482 | 0.0979 | 0.5392 | 0.0963 |
| 1 | 143 | 2.49582 | 1.9038 | 5.68994 | | | 1.6203 | 0.2848 | 0.6982 | 0.1227 | 0.6184 | 0.1087 | 0.581 | 0.1021 | 0.5596 | 0.0983 | 0.5459 | 0.0959 | 0.5366 | 0.0943 | 0.53 | |
| 1 | 146 | 2.54818 | 1.7542 | 5.73783 | 0.9606 | 0.1674 | 0.8206 | 0.143 | 0.6525 | 0.1137 | 0.595 | 0.1037 | 0.5662 | 0.0987 | 0.5492 | 0.0957 | 0.5382 | 0.0938 | 0.5306 | 0.0925 | 0.5251 | |
| Area Total = | | | | 113.097 | 12.566 | | 19.635 | | 28.274 | | 38.485 | | 50.265 | | 63.617 | | 78.54 | | 95.033 | | 113.1 | |
| Total (OD − ID) = | | | | 100.531 | 12.566 | | 7.0686 | | 8.6394 | | 10.21 | | 11.781 | | 13.352 | | 14.923 | | 16.493 | | 18.064 | |
| Band yarn length (total) = | | | | 91.2053 | 1.9211 | | 7.4327 | | 7.6866 | | 8.9425 | | 10.318 | | 11.59 | | 12.867 | | 14.52 | | 15.927 | |
| (OD − ID) | | | | 89.2842 | | | | | | | | | | | | | | | | | | |
| Yarn density (Lth/sqin) | | | | 0.80643 | | | | | | | | | | | | | | | | | | |
| (OD − ID) | | | | 0.88813 | 0.1529 | | 1.0515 | | 0.8897 | | 0.8758 | | 0.8759 | | 0.868 | | 0.8622 | | 0.8804 | | 0.8817 | |
| Realtive fill density per band (>2″ R) | | | | | | | | | | | | | | | | | | | | | | |
| Avg (>2″) | | | | 0.89816 | | | 1.1707 | | 0.991 | | 0.9752 | | 0.9752 | | 0.9664 | | 0.96 | | 0.9802 | | 0.9817 | |

Chord radius = (Outer dia./2) × cos (Chord angle/2)  
Chord length/2 = SQRT [(incremental radius)^2 − (chord radius)^2]  
or = (Outer dia./2) × sin (Chord angle/2)  
Incremental chord length = Calculated chord length − chord lengths of inner radii  
% of chord length = incremental chord length/(chord length/2) × 100

TABLE 2
|  | Angle minus X degrees | | | | | | | | | | |
| --- | --- | --- | --- | --- | --- | --- | --- | --- | --- | --- | --- |
| 0 | -1 | -2 | -3 | -4 | -5 | -6 | -7 | -8 | -9 | -10 | |
| 36 | 35 | 34 | 33 | 32 | 31 | 30 | 29 | 28 | 27 | 26 | |
| 61 | 60 | 59 | 58 | 57 | 56 | 55 | 54 | 53 | 52 | 51 | |
| 78 | 77 | 76 | 75 | 74 | 73 | 72 | 71 | 70 | 69 | 68 | |
| 94 | 93 | 92 | 91 | 90 | 89 | 88 | 87 | 86 | 85 | 84 | |
| 108 | 107 | 106 | 105 | 104 | 103 | 102 | 101 | 100 | 99 | 98 | |
| 120 | 119 | 118 | 117 | 116 | 115 | 114 | 113 | 112 | 111 | 110 | |
| 131 | 130 | 129 | 128 | 127 | 126 | 125 | 124 | 123 | 122 | 121 | |
| 138 | 137 | 136 | 135 | 134 | 133 | 132 | 131 | 130 | 129 | 128 | |
| 143 | 142 | 141 | 140 | 139 | 138 | 137 | 136 | 135 | 134 | 133 | |
| 146 | 145 | 144 | 143 | 142 | 141 | 140 | 139 | 138 | 137 | 136 | |
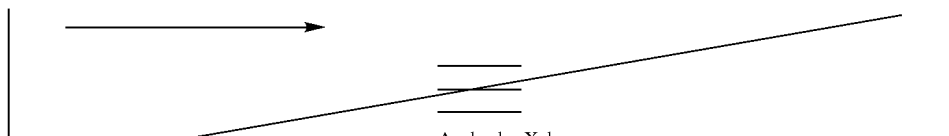
|  | Angle plus X degrees | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
|  | 37 | 38 | 39 | 40 | 41 | 42 | 43 | 44 | 45 | 46 |
|  | 62 | 63 | 64 | 65 | 66 | 67 | 68 | 69 | 70 | 71 |
|  | 79 | 80 | 81 | 82 | 83 | 84 | 85 | 86 | 87 | 88 |
|  | 95 | 96 | 97 | 98 | 99 | 100 | 101 | 102 | 103 | 104 |
|  | 109 | 110 | 111 | 112 | 113 | 114 | 115 | 116 | 117 | 118 |
|  | 121 | 122 | 123 | 124 | 125 | 126 | 127 | 128 | 129 | 130 |
|  | 132 | 133 | 134 | 135 | 136 | 137 | 138 | 139 | 140 | 141 |
|  | 139 | 140 | 141 | 142 | 143 | 144 | 145 | 146 | 147 | 148 |
|  | 144 | 145 | 146 | 147 | 148 | 149 | 150 | 151 | 152 | 153 |
|  | 147 | 148 | 149 | 150 | 151 | 152 | 153 | 154 | 155 | 156 |

TABLE 3

| Calc'd Angle | | Angle minus X degrees | | | | | | | | | | | | | | | | | | | |
|---|---|---|---|---|---|---|---|---|---|---|---|---|---|---|---|---|---|---|---|---|---|
| 0 | | -1 | | -2 | | -3 | | -4 | | -5 | | -6 | | -7 | | -8 | | -9 | | -10 |
| 36 | | 35 | | 34 | | 58 | | 32 | | 31 | | 30 | | 29 | | 28 | | 27 | | 26 |
| 61 | | 60 | | 59 | | 33 | | 57 | | 56 | | 55 | | 54 | | 53 | | 52 | | 51 |
| 78 | | 77 | | 76 | | 75 | | 74 | | 73 | | 72 | | 71 | | 70 | | 69 | | 68 |
| 94 | | 93 | | 92 | | 91 | | 90 | | 89 | | 88 | | 87 | | 86 | | 85 | | 84 |
| 108 | | 107 | | 106 | | 105 | | 104 | | 103 | | 102 | | 101 | | 100 | | 99 | | 98 |
| 120 | | 119 | | 118 | | 117 | | 116 | | 115 | | 114 | | 113 | | 112 | | 111 | | 110 |
| 131 | | 130 | | 129 | | 128 | | 127 | | 126 | | 125 | | 124 | | 123 | | 122 | | 121 |
| 138 | | 137 | | 136 | | 135 | | 134 | | 133 | | 132 | | 131 | | 130 | | 129 | | 128 |
| 143 | | 142 | | 141 | | 140 | | 139 | | 138 | | 137 | | 136 | | 135 | | 134 | | 133 |
| 146 | | 145 | | 144 | | 143 | | 142 | | 141 | | 140 | | 139 | | 138 | | 137 | | 136 |
| 1055 | 2.93 | 1045 | 2.90 | 1035 | 2.88 | 1025 | 2.85 | 1015 | 2.82 | 1005 | 2.79 | 995 | 2.76 | 985 | 2.74 | 975 | 2.71 | 965 | 2.68 | 955 |

| | | Angle plus X degrees | | | | | | | | | | | | | | | | | | | |
|---|---|---|---|---|---|---|---|---|---|---|---|---|---|---|---|---|---|---|---|---|---|
| | | 1 | | 2 | | 3 | | 4 | | 5 | | 6 | | 7 | | 8 | | 9 | | 10 |
| | | 37 | | 38 | | 39 | | 40 | | 41 | | 42 | | 43 | | 44 | | 45 | | 46 |
| | | 62 | | 63 | | 64 | | 65 | | 66 | | 67 | | 68 | | 69 | | 70 | | 71 |
| | | 79 | | 80 | | 81 | | 82 | | 83 | | 84 | | 85 | | 86 | | 87 | | 88 |
| | | 95 | | 96 | | 97 | | 98 | | 99 | | 100 | | 101 | | 102 | | 103 | | 104 |
| | | 109 | | 110 | | 111 | | 112 | | 113 | | 114 | | 115 | | 116 | | 117 | | 118 |
| | | 121 | | 122 | | 123 | | 124 | | 125 | | 126 | | 127 | | 128 | | 129 | | 130 |
| | | 132 | | 133 | | 134 | | 135 | | 136 | | 137 | | 138 | | 139 | | 140 | | 141 |
| | | 139 | | 140 | | 141 | | 142 | | 143 | | 144 | | 145 | | 146 | | 147 | | 148 |
| | | 144 | | 145 | | 146 | | 147 | | 148 | | 149 | | 150 | | 151 | | 152 | | 153 |
| | | 147 | | 148 | | 149 | | 150 | | 151 | | 152 | | 153 | | 154 | | 155 | | 156 |
| | | 1065 | 2.96 | 1075 | 2.99 | 1085 | 3.01 | 1095 | 3.04 | 1105 | 3.07 | 1115 | 3.10 | 1125 | 3.13 | 1135 | 3.15 | 1145 | 3.18 | 1155 |

| Calc'd Angle | | | | | | | | | | Cummulative Angles | | | | | | | | | | | |
|---|---|---|---|---|---|---|---|---|---|---|---|---|---|---|---|---|---|---|---|---|---|
| 0 | | -1 | | -2 | | -3 | | -4 | | -5 | | -6 | | -7 | | -8 | | -9 | | -10 | |
| 0.10 | 0.20 | 0.10 | 0.19 | 0.09 | 0.19 | 0.16 | 0.32 | 0.09 | 0.18 | 0.09 | 0.17 | 0.08 | 0.17 | 0.08 | 0.16 | 0.08 | 0.16 | 0.08 | 0.15 | 0.07 |
| 0.37 | 0.54 | 0.36 | 0.53 | 0.35 | 0.52 | 0.41 | 0.51 | 0.34 | 0.49 | 0.33 | 0.48 | 0.32 | 0.47 | 0.31 | 0.46 | 0.30 | 0.45 | 0.29 | 0.44 | 0.29 |
| 0.76 | 0.97 | 0.74 | 0.96 | 0.73 | 0.94 | 0.71 | 0.92 | 0.70 | 0.91 | 0.69 | 0.89 | 0.67 | 0.87 | 0.66 | 0.86 | 0.64 | 0.84 | 0.63 | 0.82 | 0.62 |
| 1.23 | 1.49 | 1.21 | 1.47 | 1.19 | 1.45 | 1.18 | 1.43 | 1.16 | 1.41 | 1.14 | 1.38 | 1.12 | 1.36 | 1.10 | 1.34 | 1.08 | 1.32 | 1.06 | 1.29 | 1.04 |
| 1.79 | 2.09 | 1.77 | 2.07 | 1.74 | 2.04 | 1.72 | 2.01 | 1.69 | 1.98 | 1.67 | 1.96 | 1.64 | 1.93 | 1.62 | 1.9 | 1.59 | 1.87 | 1.57 | 1.84 | 1.54 |
| 2.43 | 2.76 | 2.40 | 2.73 | 2.37 | 2.69 | 2.34 | 2.66 | 2.31 | 2.63 | 2.28 | 2.59 | 2.24 | 2.56 | 2.21 | 2.53 | 2.18 | 2.49 | 2.15 | 2.46 | 2.12 |
| 3.13 | 3.49 | 3.09 | 3.45 | 3.05 | 3.41 | 3.02 | 3.37 | 2.98 | 3.33 | 2.94 | 3.29 | 2.91 | 3.26 | 2.87 | 3.22 | 2.84 | 3.18 | 2.80 | 3.14 | 2.76 |
| 3.87 | 4.26 | 3.83 | 4.21 | 3.79 | 4.17 | 3.75 | 4.12 | 3.71 | 4.08 | 3.66 | 4.03 | 3.62 | 3.99 | 3.58 | 3.94 | 3.54 | 3.9 | 3.50 | 3.86 | 3.46 |
| 4.65 | 5.05 | 4.61 | 5 | 4.56 | 4.95 | 4.51 | 4.9 | 4.46 | 4.85 | 4.42 | 4.8 | 4.37 | 4.75 | 4.32 | 4.7 | 4.25 | 4.65 | 4.23 | 4.6 | 4.18 |
| 5.46 | 5.86 | 5.40 | 5.81 | 5.35 | 5.75 | 5.30 | 5.69 | 5.24 | 5.64 | 5.19 | 5.58 | 5.14 | 5.53 | 5.09 | 5.47 | 5.03 | 5.42 | 4.98 | 5.36 | 4.93 |

TABLE 3-continued

| Calc'd Angle | | | | | | | | | Cummulative Angles | | | | | | | | | | | |
|---|---|---|---|---|---|---|---|---|---|---|---|---|---|---|---|---|---|---|---|---|
| 0 | | -1 | | -2 | | -3 | | -4 | | -5 | | -6 | | -7 | | -8 | | -9 | | -10 |
| | | 0.10 | 0.21 | 0.11 | 0.21 | 0.11 | 0.22 | 0.11 | 0.22 | 0.11 | 0.23 | 0.12 | 0.23 | 0.12 | 0.24 | 0.12 | 0.24 | 0.13 | 0.25 | 0.13 |
| | | 0.38 | 0.55 | 0.39 | 0.56 | 0.39 | 0.57 | 0.40 | 0.58 | 0.41 | 0.59 | 0.42 | 0.61 | 0.43 | 0.62 | 0.44 | 0.63 | 0.44 | 0.64 | 0.45 |
| | | 0.77 | 0.99 | 0.78 | 1.01 | 0.80 | 1.02 | 0.81 | 1.04 | 0.83 | 1.06 | 0.84 | 1.07 | 0.85 | 1.09 | 0.87 | 1.11 | 0.88 | 1.12 | 0.89 |
| | | 1.25 | 1.52 | 1.27 | 1.54 | 1.29 | 1.56 | 1.31 | 1.58 | 1.33 | 1.61 | 1.35 | 1.63 | 1.37 | 1.65 | 1.39 | 1.67 | 1.41 | 1.69 | 1.43 |
| | | 1.82 | 2.12 | 1.84 | 2.15 | 1.87 | 2.18 | 1.89 | 2.21 | 1.92 | 2.23 | 1.94 | 2.26 | 1.97 | 2.29 | 1.99 | 2.32 | 2.02 | 2.34 | 2.04 |
| | | 2.46 | 2.79 | 2.49 | 2.83 | 2.52 | 2.86 | 2.55 | 2.89 | 2.58 | 2.93 | 2.61 | 2.96 | 2.64 | 2.99 | 2.67 | 3.03 | 2.70 | 3.06 | 2.73 |
| | | 3.16 | 3.53 | 3.20 | 3.57 | 3.23 | 3.61 | 3.27 | 3.64 | 3.31 | 3.68 | 3.34 | 3.72 | 3.38 | 3.76 | 3.41 | 3.8 | 3.45 | 3.84 | 3.49 |
| | | 3.91 | 4.3 | 3.96 | 4.34 | 4.00 | 4.39 | 4.04 | 4.43 | 4.08 | 4.48 | 4.12 | 4.52 | 4.16 | 4.57 | 4.21 | 4.61 | 4.25 | 4.66 | 4.29 |
| | | 4.70 | 5.1 | 4.75 | 5.15 | 4.79 | 5.2 | 4.84 | 5.25 | 4.89 | 5.3 | 4.94 | 5.35 | 4.98 | 5.4 | 5.03 | 5.45 | 5.08 | 5.5 | 5.13 |
| | | 5.51 | 5.92 | 5.56 | 5.97 | 5.61 | 6.03 | 5.67 | 6.08 | 5.72 | 6.14 | 5.77 | 6.19 | 5.83 | 6.25 | 5.88 | 6.31 | 5.93 | 6.36 | 5.98 |

| Calc'd Angle | | | | | | Angle minus X degrees | | | | |
|---|---|---|---|---|---|---|---|---|---|---|
| 0 | -1 | -2 | -3 | -4 | -5 | -6 | -7 | -8 | -9 | -10 |
| 47 | 46 | 45 | 69 | 43 | 42 | 41 | 40 | 39 | 38 | 37 |
| 72 | 71 | 70 | 44 | 68 | 56 | 55 | 54 | 53 | 52 | 51 |
| 89 | 88 | 87 | 86 | 85 | 84 | 83 | 82 | 81 | 80 | 79 |
| 105 | 104 | 103 | 102 | 101 | 100 | 99 | 98 | 97 | 96 | 95 |
| 119 | 118 | 117 | 116 | 115 | 114 | 113 | 112 | 111 | 110 | 109 |
| 128 | 127 | 126 | 125 | 124 | 123 | 122 | 121 | 120 | 119 | 118 |
| 139 | 138 | 137 | 136 | 135 | 134 | 133 | 132 | 131 | 130 | 129 |
| 146 | 145 | 144 | 143 | 142 | 141 | 140 | 139 | 138 | 137 | 136 |
| 151 | 150 | 149 | 148 | 147 | 146 | 145 | 144 | 143 | 142 | 141 |
| 154 | 153 | 152 | 151 | 150 | 149 | 148 | 147 | 146 | 145 | 144 |
| 1150 3.19 | 1140 3.17 | 1130 3.14 | 1120 3.11 | 1110 3.08 | 1089 3.03 | 1079 3.00 | 1069 2.97 | 1059 2.94 | 1049 2.91 | 1039 2.89 |

| | | | | | Angle plus X degrees | | | | | |
|---|---|---|---|---|---|---|---|---|---|---|
| | 1 | 2 | 3 | 4 | 5 | 6 | 7 | 8 | 9 | 10 |
| | 48 | 49 | 50 | 51 | 52 | 53 | 54 | 55 | 56 | 57 |
| | 73 | 74 | 75 | 76 | 77 | 76 | 79 | 80 | 81 | 82 |
| | 90 | 91 | 92 | 93 | 94 | 95 | 96 | 97 | 98 | 99 |
| | 106 | 107 | 108 | 109 | 110 | 111 | 112 | 113 | 114 | 115 |
| | 120 | 121 | 122 | 123 | 124 | 125 | 126 | 127 | 128 | 129 |
| | 129 | 130 | 131 | 132 | 133 | 134 | 135 | 136 | 137 | 138 |
| | 140 | 141 | 142 | 143 | 144 | 145 | 146 | 147 | 148 | 149 |
| | 147 | 148 | 149 | 150 | 151 | 152 | 153 | 154 | 155 | 156 |
| | 152 | 153 | 154 | 155 | 156 | 157 | 158 | 159 | 160 | 161 |
| | 155 | 156 | 157 | 158 | 159 | 160 | 151 | 162 | 163 | 164 |
| | 1160 3.22 | 1170 3.25 | 1180 3.28 | 1190 3.31 | 1200 3.33 | 1210 3.36 | 1220 3.39 | 1230 3.42 | 1240 3.44 | 1250 3.47 |

TABLE 3-continued

| Calc'd Angle | | | | | | | | | | Cummulative Angles | | | | | | | | | | |
|---|---|---|---|---|---|---|---|---|---|---|---|---|---|---|---|---|---|---|---|---|
| 0 | | -1 | | -2 | | -3 | | -4 | | -5 | | -6 | | -7 | | -8 | | -9 | | -10 |
| 0.13 | 0.26 | 0.13 | 0.26 | 0.13 | 0.25 | 0.19 | 0.38 | 0.12 | 0.24 | 0.12 | 0.23 | 0.11 | 0.23 | 0.11 | 0.22 | 0.11 | 0.22 | 0.11 | 0.21 | 0.10 |
| 0.46 | 0.66 | 0.45 | 0.65 | 0.44 | 0.64 | 0.51 | 0.63 | 0.43 | 0.62 | 0.39 | 0.54 | 0.38 | 0.53 | 0.37 | 0.52 | 0.36 | 0.51 | 0.36 | 0.5 | 0.35 |
| 0.91 | 1.16 | 0.89 | 1.14 | 0.88 | 1.12 | 0.87 | 1.11 | 0.85 | 1.09 | 0.78 | 1.01 | 0.76 | 0.99 | 0.75 | 0.98 | 0.74 | 1.96 | 0.72 | 0.94 | 0.71 |
| 1.45 | 1.74 | 1.43 | 1.72 | 1.41 | 1.69 | 1.39 | 1.67 | 1.37 | 1.65 | 1.29 | 1.57 | 1.27 | 1.54 | 1.25 | 1.52 | 1.23 | 1.5 | 1.21 | 1.48 | 1.19 |
| 2.07 | 2.4 | 2.04 | 2.37 | 2.02 | 2.34 | 1.99 | 2.32 | 1.97 | 2.29 | 1.88 | 2.2 | 1.86 | 2.17 | 1.83 | 2.14 | 1.81 | 2.12 | 1.78 | 2.09 | 1.76 |
| 2.76 | 3.11 | 2.73 | 3.08 | 2.69 | 3.04 | 2.66 | 3.01 | 2.63 | 2.98 | 2.54 | 2.88 | 2.51 | 2.85 | 2.48 | 2.82 | 2.45 | 2.78 | 2.42 | 2.75 | 2.39 |
| 3.50 | 3.88 | 3.46 | 3.84 | 3.43 | 3.81 | 3.39 | 3.77 | 3.35 | 3.73 | 3.26 | 3.63 | 3.22 | 3.59 | 3.18 | 3.55 | 3.15 | 3.51 | 3.11 | 3.47 | 3.08 |
| 4.29 | 4.69 | 4.25 | 4.65 | 4.21 | 4.61 | 4.16 | 4.56 | 4.12 | 4.52 | 4.02 | 4.41 | 3.98 | 4.37 | 3.94 | 4.32 | 3.89 | 4.28 | 3.85 | 4.23 | 3.81 |
| 5..11 | 5.53 | 5.07 | 5.48 | 5.02 | 5.43 | 4.97 | 5.38 | 4.93 | 5.33 | 4.82 | 5.22 | 4.77 | 5.17 | 4.72 | 5.12 | 4.68 | 5.07 | 4.63 | 5.02 | 4.58 |
| 5.96 | 6.39 | 5.91 | 6.33 | 5.86 | 6.28 | 5.80 | 6.22 | 5.75 | 6.17 | 5.64 | 5.64 | 5.58 | 5.99 | 5.53 | 5.94 | 5.48 | 5.88 | 5.43 | 5.83 | 5.37 |

| Calc'd Angle | | | | | | | | | | Cummulative Angles | | | | | | | | | | |
|---|---|---|---|---|---|---|---|---|---|---|---|---|---|---|---|---|---|---|---|---|
| 0 | | -1 | | -2 | | -3 | | -4 | | -5 | | -6 | | -7 | | -8 | | -9 | | -10 |
| | 0.13 | 0.27 | 0.14 | 0.27 | 0.14 | 0.28 | 0.14 | 0.28 | 0.14 | 0.29 | 0.15 | 0.29 | 0.15 | 0.30 | 0.15 | 0.31 | 0.16 | 0.31 | 0.16 | |
| | 0.47 | 0.67 | 0.48 | 0.68 | 0.49 | 0.69 | 0.49 | 0.71 | 0.50 | 0.72 | 0.50 | 0.73 | 0.52 | 0.74 | 0.53 | 0.75 | 0.54 | 0.76 | 0.54 | |
| | 0.92 | 1.17 | 0.94 | 1.19 | 0.95 | 1.21 | 0.96 | 1.22 | 0.98 | 1.24 | 0.98 | 1.26 | 1.01 | 1.27 | 1.02 | 1.29 | 1.03 | 1.31 | 1.05 | |
| | 1.47 | 1.76 | 1.49 | 1.78 | 1.51 | 1.81 | 1.53 | 1.83 | 1.54 | 1.85 | 1.54 | 1.87 | 1.58 | 1.89 | 1.60 | 1.92 | 1.62 | 1.94 | 1.64 | |
| | 2.09 | 2.43 | 2.12 | 2.46 | 2.14 | 2.48 | 2.17 | 2.51 | 2.19 | 2.54 | 2.19 | 2.57 | 2.24 | 2.59 | 2.27 | 2.62 | 2.29 | 2.65 | 2.32 | |
| | 2.79 | 3.14 | 2.82 | 3.18 | 2.85 | 3.21 | 2.88 | 3.24 | 2.91 | 3.28 | 2.91 | 3.31 | 2.97 | 3.34 | 3.00 | 3.38 | 3.03 | 3.41 | 3.06 | |
| | 3.53 | 3.92 | 3.57 | 3.96 | 3.61 | 4 | 3.64 | 4.04 | 3.68 | 4.08 | 3.68 | 4.12 | 3.75 | 4.16 | 3.79 | 4.19 | 3.82 | 4.23 | 3.86 | |
| | 4.33 | 4.74 | 4.37 | 4.78 | 4.41 | 4.83 | 4.46 | 4.87 | 4.50 | 4.92 | 4.50 | 4.96 | 4.58 | 5.01 | 4.62 | 5.05 | 4.66 | 5.09 | 4.71 | |
| | 5.16 | 5.58 | 5.21 | 5.63 | 5.26 | 5.68 | 5.30 | 5.73 | 5.35 | 5.78 | 5.35 | 5.83 | 5.44 | 5.88 | 5.49 | 5.93 | 5.54 | 5.98 | 5.59 | |
| | 6.01 | 6.44 | 6.07 | 6.5 | 6.12 | 6.56 | 6.17 | 6.61 | 6.23 | 6.67 | 6.23 | 6.72 | 6.33 | 6.78 | 6.38 | 6.83 | 6.44 | 6.89 | 6.49 | |

TABLE 5

| 99 angle wind pattern straight | | | | | | | | | | |
|---|---|---|---|---|---|---|---|---|---|---|
| Angle softening | | | | | | | | | | |
| 0 | 1 | -7 | 3 | -9 | 5 | -2 | 6 | -8 | 4 | -10 |
| 23 | 24 | 16 | 26 | 14 | 28 | 21 | 29 | 15 | 27 | 13 |
| 53 | 54 | 46 | 56 | 44 | 58 | 51 | 59 | 45 | 57 | 43 |
| 73 | 74 | 66 | 76 | 64 | 78 | 71 | 79 | 65 | 77 | 63 |
| 90 | 91 | 83 | 93 | 81 | 95 | 88 | 96 | 82 | 94 | 80 |
| 105 | 106 | 98 | 108 | 96 | 110 | 103 | 111 | 97 | 109 | 95 |
| 120.1 | 121.1 | 113.1 | 123.1 | 111.1 | 125.1 | 118.1 | 126.1 | 112.1 | 124.1 | 110.1 |
| 130 | 131 | 123 | 133 | 121 | 135 | 128 | 136 | 122 | 134 | 120 |
| 137 | 138 | 130 | 140 | 128 | 142 | 135 | 143 | 129 | 141 | 127 |
| 140 | 141 | 133 | 143 | 131 | 145 | 138 | 146 | 132 | 144 | 130 |

TABLE 5-continued
| Angles in 0.XX of revolution | | | | | | | | | | |
|---|---|---|---|---|---|---|---|---|---|---|
| 0.06 | 0.07 | 0.04 | 0.07 | 0.04 | 0.08 | 0.06 | 0.08 | 0.04 | 0.08 | 0.04 |
| 0.15 | 0.15 | 0.13 | 0.16 | 0.12 | 0.16 | 0.14 | 0.16 | 0.13 | 0.16 | 0.12 |
| 0.20 | 0.21 | 0.18 | 0.21 | 0.18 | 0.22 | 0.20 | 0.22 | 0.18 | 0.21 | 0.18 |
| 0.25 | 0.25 | 0.23 | 0.26 | 0.23 | 0.26 | 0.24 | 0.27 | 0.23 | 0.26 | 0.22 |
| 0.29 | 0.29 | 0.27 | 0.30 | 0.27 | 0.31 | 0.29 | 0.31 | 0.27 | 0.30 | 0.26 |
| 0.33 | 0.34 | 0.31 | 0.34 | 0.31 | 0.35 | 0.33 | 0.35 | 0.31 | 0.34 | 0.31 |
| 0.36 | 0.36 | 0.34 | 0.37 | 0.34 | 0.38 | 0.36 | 0.38 | 0.34 | 0.37 | 0.35 |
| 0.38 | 0.38 | 0.36 | 0.39 | 0.36 | 0.39 | 0.38 | 0.40 | 0.36 | 0.39 | 0.35 |
| 0.39 | 0.39 | 0.37 | 0.40 | 0.36 | 0.40 | 0.38 | 0.41 | 0.37 | 0.40 | 0.36 |
| Cummulative Angle Sequence | | | | | | | | | | |
|---|---|---|---|---|---|---|---|---|---|---|
| 0.06 | 0.07 | 0.04 | 0.07 | 0.04 | 0.08 | 0.06 | 0.08 | 0.04 | 0.08 | 0.04 |
| 0.21 | 0.22 | 0.17 | 0.23 | 0.16 | 0.24 | 0.20 | 0.24 | 0.17 | 0.23 | 0.16 |
| 0.41 | 0.42 | 0.36 | 0.44 | 0.34 | 0.46 | 0.40 | 0.46 | 0.35 | 0.45 | 0.33 |
| 0.66 | 0.68 | 0.59 | 0.70 | 0.56 | 0.72 | 0.64 | 0.73 | 0.58 | 0.71 | 0.55 |
| 0.96 | 0.97 | 0.85 | 1.00 | 0.83 | 1.03 | 0.93 | 1.04 | 0.84 | 1.01 | 0.82 |
| 1.29 | 1.31 | 1.17 | 1.34 | 1.14 | 1.37 | 1.26 | 1.39 | 1.16 | 1.36 | 1.12 |
| 1.65 | 1.67 | 1.51 | 1.71 | 1.48 | 1.75 | 1.61 | 1.77 | 1.49 | 1.73 | 1.46 |
| 2.03 | 2.05 | 1.88 | 2.10 | 1.83 | 2.14 | 1.99 | 2.16 | 1.85 | 2.12 | 1.81 |
| 2.42 | 2.44 | 2.24 | 2.49 | 2.19 | 2.54 | 2.37 | 2.57 | 2.22 | 2.52 | 2.17 |
76.60 inches/col.  Preform footage required = 6504  4k  3 Number of tows
70.22 ft./seq.  30.0 Sequences wound
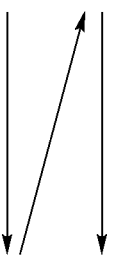

TABLE 6A

| # Tows = 3 | | Outer Diameter | 8.40 inches | | | | | | | | | | | | | | | | | |
|---|---|---|---|---|---|---|---|---|---|---|---|---|---|---|---|---|---|---|---|---|
| 1 side | Band | | Inner Diameter | 2.00 inches | | | | 0.1 | | 0.2 | | 0.3 | | 0.4 | | 0.5 | | 0.6 | |
| Number of tows/ Band | Chord angle degree | Chord angle radians | Chord radius inches | Length Chord/2 inches | Chord Length 0–1D | Fract. of chord 0–1D | Chord Length 0–0.1 annulus 1.32 | Fract. of chord | Chord Length To 0.2 annulus 1.64 | Fract. of chord | Chord Length To 0.3 annulus 1.96 | Fract. of chord | Chord Length To 0.4 annulus 2.28 | Fract. of chord | Chord Length To 0.5 annulus 2.6 | Fract. of chord | Chord Length To 0.6 annulus 2.92 | Fract. of chord |
| 39 | 62 | 1.0821 | 3.6001 | 2.16316 | | | | | | | | | | | | | | | |
| 35 | 73 | 1.27409 | 3.3762 | 2.49826 | | | | | | | | | | | | | | | |
| 42 | 82.05 | 1.43204 | 3.1686 | 2.75683 | | | | | | | | | | | | | | | |
| 24 | 92 | 1.6057 | 2.9176 | 3.02123 | | | | | | | | | | | | | | | |
| 20 | 99 | 1.72788 | 2.7277 | 3.19371 | | | | | | | | | | | | | | | |
| 20 | 102.1 | 1.78198 | 2.6403 | 3.26632 | | | | | | | | | | | | | 0.1192 | 0.0395 |
| 18 | 107 | 1.8675 | 2.4983 | 3.3762 | | | | | | | | | | | | | 1.0422 | 0.3263 |
| 11 | 111 | 1.93732 | 2.3789 | 3.46133 | | | | | | | | | | | | | 1.2471 | 0.3818 |
| 19 | 116 | 2.02458 | 2.2257 | 3.5618 | | | | | | | | | | | 0.7202 | 0.2133 | 0.6441 | 0.1861 |
| 20 | 123 | 2.14675 | 2.0041 | 3.69103 | | | | | | | | | | | 1.0492 | 0.3031 | 0.5462 | 0.1533 |
| 15 | 123 | 2.14675 | 2.0041 | 3.69103 | | | | | | | | | 1.0873 | 0.2946 | 1.344 | 0.3773 | 0.4673 | 0.1266 |
| 29 | 28.1 | 2.23577 | 1.8379 | 3.77654 | 0.6811 | 0.1803 | | | | | | | 1.0873 | 0.2946 | 0.5692 | 0.1542 | 0.4673 | 0.1266 |
| 20 | 131.9 | 2.30209 | 1.7116 | 3.8354 | | | | | | | 0.43 | 0.1139 | 0.4509 | 0.1176 | 0.5692 | 0.1542 | | |
| 22 | 137 | 2.3911 | 1.5393 | 3.90775 | | | | | 0.4898 | 0.1297 | 0.5513 | 0.1437 | 0.4686 | 0.1199 | 0.4086 | 0.1065 | 0.386 | 0.0988 |
| 16 | 139 | 2.42601 | 1.4709 | 3.93402 | | | | | 0.9549 | 0.249 | 0.8475 | 0.1657 | 0.4467 | 0.1135 | 0.4134 | 0.1058 | 0.3785 | 0.0962 |
| 13 | 141 | 2.46091 | 1.402 | 3.95909 | | | | | 0.5658 | 0.1448 | 0.5701 | 0.1449 | 0.4283 | 0.1082 | 0.4018 | 0.1021 | 0.3718 | 0.0939 |
| 24 | 145 | 2.53073 | 1.263 | 4.00561 | | | | | 0.7254 | 0.1844 | 0.5188 | 0.131 | 0.3994 | 0.0997 | 0.3916 | 0.0989 | 0.3601 | 0.0899 |
| 31 | 149.1 | 2.60229 | 1.1189 | 4.04823 | | | | | 0.8509 | 0.2149 | 0.4526 | 0.113 | 0.3773 | 0.0932 | 0.3744 | 0.0935 | 0.3502 | 0.0865 |
| 34 | 152.9 | 2.66774 | 0.9858 | 4.08267 | 0.1678 | 0.0411 | 0.3838 | 0.0958 | 0.6624 | 0.1854 | 0.4102 | 0.1013 | 0.3618 | 0.0886 | 0.3604 | 0.089 | 0.3427 | 0.0839 |
| 43 | 153.7 | 2.68257 | 0.9555 | 4.06967 | 0.295 | 0.0721 | 0.7004 | 0.173 | 0.4987 | 0.1232 | 0.3834 | 0.0939 | 0.3588 | 0.0877 | 0.35 | 0.0857 | 0.3412 | 0.0834 |
| | | | | | 0.4628 | | 0.6157 | 0.1506 | 0.4328 | 0.106 | 0.3764 | 0.0925 | | | 0.3479 | 0.0851 | | |
| | | | | | | | | | 0.4222 | 0.1032 | | | | | | | | |

Area Total = 55.4177 sq. in. Total (OC – ID) = 52.2761
Band yarn length (total) = 3415.84 inches (OD – ID) = 3379.06
Yarn density (Lth/sq in) (OD – ID) = 61.6381 | 64.6387 | 11.708
Relative fill density per band (>2" R) = 65.5714
Avg (>2") 495
Total angles 1485
# of tows wound Arial dens. g/sq. cm. Yield ft/# 3470

| | | | | | | |
|---|---|---|---|---|---|---|
| | 0–0.1 | 0.2 | 0.3 | 0.4 | 0.5 | 0.6 |
| | 2.4099 | 8.4496 | 12.069 | 16.331 | 21.237 | 26.786 |
| | 5.4739 | 2.9757 | 3.6191 | 4.2625 | 4.9059 | 5.5493 |
| | 2.3323 | 198.68 | 243.7 | 280.99 | 321.63 | 365.11 |
| | 163.08 | 66.767 | 67.336 | 65.922 | 65.561 | 65.793 |
| | 69.922 | 1.018 | 1.0269 | 1.0053 | 0.9998 | 1.0034 |
| | 1.0663 | Target density 0.66 g/cc | Sequence thickness 0.5037 cm 0.1983 inch | | | |
| | 0.3324 2k | | Symetric wind (+ and –) 1.0074 cm 0.3966 inch | | | |

| | 0.7 | | 0.8 | | 0.9 | | 1 | |
|---|---|---|---|---|---|---|---|---|
| | Chord Length To 0.7 annulus 3.24 | Fract. of chord | Chord Length To 0.8 annulus 3.56 | Fract. of chord | Chord Length To 0.9 annulus 3.88 | Fract. of chord | Chord Length To 1.0 annulus 4.2 | Fract. of chord |
| | | | | | 1.446949 | 0.668905 | 0.716211 | 0.331095 |
| | | | 1.1291 | 0.452 | 0.782877 | 0.313369 | 0.586272 | 0.234673 |

1 side Number of tows/ Band
39
35

Wind time Est. = 1 angle/sec. 8.25
Wind time Est. = 1 angle/sec. 16.5

TABLE 6A-continued

| | | | | | | | |
|---|---|---|---|---|---|---|---|
| 42 | 0.6765 | 0.2454 | 0.9463 | 0.3433 | 0.616439 | 0.223604 | 0.517519 | 0.187723 |
| 24 | 1.2898 | 0.4269 | 0.6309 | 0.2088 | 0.517821 | 0.171394 | 0.463452 | 0.153399 |
| 20 | 0.7063 | 0.2212 | 0.5391 | 0.1688 | 0.471723 | 0.147704 | 0.43433 | 0.135996 |
| 20 | 0.6308 | 0.1931 | 0.5101 | 0.1562 | 0.455126 | 0.139339 | 0.423215 | 0.129569 |
| 18 | 0.5514 | 0.1633 | 0.4731 | 0.1401 | 0.432488 | 0.128099 | 0.407509 | 0.120701 |
| 11 | 0.5064 | 0.1463 | 0.4488 | 0.1297 | 0.416688 | 0.120384 | 0.39617 | 0.114456 |
| 19 | 0.4644 | 0.1304 | 0.4239 | 0.119 | 0.399686 | 0.112215 | 0.383621 | 0.107704 |
| 20 | 0.4221 | 0.1144 | 0.3965 | 0.1074 | 0.380034 | 0.102962 | 0.368666 | 0.099882 |
| 15 | 0.4221 | 0.1144 | 0.3965 | 0.1074 | 0.380034 | 0.102962 | 0.368666 | 0.099882 |
| 29 | 0.3992 | 0.1057 | 0.3806 | 0.1008 | 0.368202 | 0.097497 | 0.359428 | 0.095174 |
| 20 | 0.3852 | 0.1004 | 0.3705 | 0.0966 | 0.360532 | 0.094001 | 0.353347 | 0.092128 |
| 22 | 0.3697 | 0.0946 | 0.359 | 0.0919 | 0.351586 | 0.089971 | 0.346161 | 0.088583 |
| 16 | 0.3644 | 0.0926 | 0.355 | 0.0902 | 0.348461 | 0.088576 | 0.343628 | 0.087348 |
| 13 | 0.3596 | 0.0908 | 0.3513 | 0.0887 | 0.345536 | 0.087277 | 0.341246 | 0.086193 |
| 24 | 0.351 | 0.0876 | 0.3447 | 0.0861 | 0.340253 | 0.084944 | 0.336916 | 0.084111 |
| 31 | 0.3435 | 0.0849 | 0.3389 | 0.0837 | 0.335571 | 0.082893 | 0.33305 | 0.082271 |
| 34 | 0.3378 | 0.0827 | 0.3344 | 0.0819 | 0.33189 | 0.081292 | 0.329992 | 0.080828 |
| 43 | 0.3367 | 0.0823 | 0.3335 | 0.0815 | 0.331132 | 0.080964 | 0.32936 | 0.080531 |
| Area Total = | 8.9171 | | 9.0625 | | 9.413028 | | 8.13876 | |
| sq in. Total (OD − ID) = | 32.979 | | 39.815 | | 47.29479 | | 55.41769 | |
| Band yarn length (total) = inches (OD − ID) | 6.1927 | | 6.8361 | | 7.479504 | | 8.122902 | |
| Yarn density (Lth/sqin) (OD − 1D) | 416.33 | | 463.72 | | 507.4657 | | 418.3587 | |
| Relative fill density per band (>2" R) | 67.228 | | 67.834 | | 67.84751 | | 51.5036 | |
| Avg (>2") | 1.0253 | | 1.0045 | | 1.034711 | | 0.785458 | |

TABLE 6B

Incremental fill of chords

| Chord Angle | Percentage of total thickness per Incremental Radius | | | | | | | | | |
|---|---|---|---|---|---|---|---|---|---|---|
| | 1 | 2 | 3 | 4 | 5 | 6 | 7 | 8 | 9 | 10 |
| 62 | 0 | 0 | 0 | 0 | 0 | 0 | 0 | 0 | 0.249223 | 0.125629 |
| 73 | 0 | 0 | 0 | 0 | 0 | 0 | 0 | 0.170334 | 0.113399 | 0.095201 |
| 82.05 | 0 | 0 | 0 | 0 | 0 | 0 | 0.134453 | 0.17151 | 0.10724 | 0.09922 |
| 92 | 0 | 0 | 0 | 0 | 0 | 0 | 0.160202 | 0.065315 | 0.044885 | 0.055936 |
| 99 | 0 | 0 | 0 | 0 | 0 | 0.108109 | 0.066985 | 0.046508 | 0.031654 | 0.045473 |
| 102.1 | 0 | 0 | 0 | 0 | 0 | 0.129395 | 0.059814 | 0.044004 | 0.0305 | 0.04424 |
| 107 | 0 | 0 | 0 | 0 | 0 | 0.141185 | 0.047056 | 0.036731 | 0.024951 | 0.039175 |
| 111 | 0 | 0 | 0 | 0 | 0.083255 | 0.036798 | 0.026405 | 0.021295 | 0.010407 | 0.026838 |
| 116 | 0 | 0 | 0 | 0.062474 | 0.116671 | 0.053888 | 0.041826 | 0.034739 | 0.025337 | 0.037905 |
| 123 | 0 | 0 | 0 | 0.144961 | 0.082234 | 0.048528 | 0.040021 | 0.034201 | 0.026414 | 0.037359 |
| 123 | 0 | 0 | 0 | 0.10872 | 0.061676 | 0.036396 | 0.030016 | 0.025651 | 0.017446 | 0.030015 |
| 128.1 | 0 | 0 | 0.161764 | 0.129434 | 0.102592 | 0.064744 | 0.054882 | 0.047605 | 0.041719 | 0.048848 |
| 131.9 | 0 | 0 | 0.156583 | 0.073613 | 0.065133 | 0.042433 | 0.036523 | 0.031963 | 0.025952 | 0.034973 |
| 137 | 0 | 0.124948 | 0.117071 | 0.068819 | 0.065687 | 0.044086 | 0.038551 | 0.034065 | 0.029239 | 0.036472 |
| 139 | 0 | 0.116629 | 0.074933 | 0.047704 | 0.046435 | 0.031446 | 0.027637 | 0.024501 | 0.019371 | 0.027763 |
| 141 | 0 | 0.111216 | 0.055394 | 0.037165 | 0.036767 | 0.025095 | 0.022156 | 0.0197 | 0.014584 | 0.023259 |
| 145 | 0.1122 | 0.160356 | 0.08921 | 0.063977 | 0.064894 | 0.04487 | 0.039927 | 0.035683 | 0.032578 | 0.037246 |
| 149.1 | 0.265526 | 0.155763 | 0.104415 | 0.078065 | 0.080674 | 0.056363 | 0.050481 | 0.045315 | 0.043813 | 0.045591 |
| 152.85 | 0.29712 | 0.148233 | 0.107029 | 0.082101 | 0.085938 | 0.060494 | 0.054445 | 0.049036 | 0.048601 | 0.048627 |
| 153.7 | 0.325153 | 0.182855 | 0.1336 | 0.102967 | 0.108045 | 0.076169 | 0.068619 | 0.061844 | 0.062686 | 0.060231 |

TABLE 6C

Winding Sequence of Chords

| Sort # | Chord | 1 | 2 | 3 | 4 | 5 | 6 | 7 | 8 | 9 | 10 |
|---|---|---|---|---|---|---|---|---|---|---|---|
| 1 | 152.85 | 0.29712 | 0.148233 | 0.107029 | 0.082101 | 0.085938 | 0.060494 | 0.054445 | 0.049036 | 0.048601 | 0.048627 |
| 2 | 137 | 0 | 0.124948 | 0.117071 | 0.068819 | 0.065687 | 0.044086 | 0.038551 | 0.034065 | 0.029239 | 0.036472 |
| 3 | 99 | 0 | 0 | 0 | 0 | 0 | 0.108109 | 0.066985 | 0.046508 | 0.031654 | 0.045473 |
| 4 | 73 | 0 | 0 | 0 | 0 | 0 | 0 | 0 | 0.170334 | 0.113399 | 0.095201 |
| 5 | 62 | 0 | 0 | 0 | 0 | 0 | 0 | 0 | 0 | 0.249223 | 0.125629 |
| 6 | 92 | 0 | 0 | 0 | 0 | 0 | 0 | 0.160202 | 0.065315 | 0.044885 | 0.055936 |
| 7 | 111 | 0 | 0 | 0 | 0 | 0.083255 | 0.036798 | 0.026405 | 0.021295 | 0.010407 | 0.026838 |
| 8 | 123 | 0 | 0 | 0 | 0.10872 | 0.061676 | 0.036396 | 0.030016 | 0.025651 | 0.017446 | 0.030015 |
| 9 | 123 | 0 | 0 | 0 | 0.144961 | 0.082234 | 0.048528 | 0.040021 | 0.034201 | 0.026414 | 0.037359 |
| 10 | 139 | 0 | 0.116629 | 0.074933 | 0.047704 | 0.046435 | 0.031446 | 0.027637 | 0.024501 | 0.019371 | 0.027763 |
| 11 | 153.7 | 0.325153 | 0.182855 | 0.1336 | 0.102967 | 0.108045 | 0.076169 | 0.068619 | 0.061844 | 0.062686 | 0.060231 |
| 12 | 149.1 | 0.265526 | 0.155763 | 0.104415 | 0.078065 | 0.080674 | 0.056363 | 0.050481 | 0.045315 | 0.043813 | 0.045591 |
| 13 | 141 | 0 | 0.111216 | 0.055394 | 0.037165 | 0.036767 | 0.025095 | 0.022156 | 0.0197 | 0.014584 | 0.023259 |
| 14 | 131.9 | 0 | 0 | 0.156583 | 0.073613 | 0.065133 | 0.042433 | 0.036523 | 0.031963 | 0.025952 | 0.034973 |
| 15 | 116 | 0 | 0 | 0 | 0.062474 | 0.116671 | 0.053888 | 0.041826 | 0.034739 | 0.025337 | 0.037905 |
| 16 | 107 | 0 | 0 | 0 | 0 | 0 | 0.141185 | 0.047056 | 0.036731 | 0.024951 | 0.039175 |
| 17 | 82.05 | 0 | 0 | 0 | 0 | 0 | 0 | 0.134453 | 0.17151 | 0.10724 | 0.09922 |
| 18 | 102.1 | 0 | 0 | 0 | 0 | 0 | 0.129395 | 0.059814 | 0.044004 | 0.0305 | 0.04424 |
| 19 | 128.1 | 0 | 0 | 0.161764 | 0.129434 | 0.102592 | 0.064744 | 0.054882 | 0.047605 | 0.041719 | 0.048848 |
| 20 | 145 | 0.1122 | 0.160356 | 0.08921 | 0.063977 | 0.064894 | 0.04487 | 0.039927 | 0.035683 | 0.032578 | 0.037246 |

Chord fills sorted by wind sequence

What is claimed is:

1. A composite preform wherein 5–100% of the fibers in the preform are disposed as substantially continuous chords of a circle within the preform boundary.

2. A composite preform comprising fibers disposed as chords of a circle wherein the chords are substantially continuous within the preform boundary and the preform is substantially isotropic.

3. A carbon fiber preform comprising substantially continuous carbon fiber tows disposed as chords of a circle wherein the chords are substantially continuous within the preform boundary and the preform is substantially isotropic at the lamina level with respect to its strength, stiffness and thermal properties.

4. A composite preform comprising fibers disposed as chords of a circle wherein the fibers are substantially continuous within the preform boundary and the fibers in the preform are disposed in numerous orientations.

5. A carbon fiber preform comprising carbon fiber tows disposed as chords of a circle wherein the fibers are substantially continuous within the preform boundary and the carbon fiber tows in the preform are disposed in numerous orientations.

6. The preform of claim 2 wherein the preform is needlefelted for three dimensional reinforcement.

7. The preform of claim 3 wherein the preform is needlefelted for three dimensional reinforcement.

8. The preform of claim 4 wherein the preform is needlefelted for three dimensional reinforcement.

9. The preform of claim 5 wherein the preform is needlefelted for three dimensional reinforcement.

10. The carbon fiber preform of claim 3 wherein said preform is embedded in a matrix material wherein the matrix material is selected from the group consisting of thermoset resins, thermoplastic resins, carbon, metal and ceramic.

11. The carbon fiber preform of claim 5 wherein said preform is embedded in a matrix material wherein the matrix material is selected from the group consisting of thermoset resins, thermoplastic resins, carbon, metal and ceramic.

12. The carbon fiber preform of claim 11 wherein the matrix is carbon.

13. A carbon fiber preform used to manufacture friction discs comprising carbon fiber tows disposed as chords of a circle wherein the angle and placement of said chords is selected to optimize the strength, stiffness and frictional properties at various planes of the friction disc.

14. A composite preform comprising fibers disposed as chords of a circle wherein the chords are substantially continuous within the preform boundary and wherein the preform has substantially uniform radial fiber areal weight and angular fiber areal weight.

* * * * *